US011035732B2

(12) United States Patent
Koenen

(10) Patent No.: US 11,035,732 B2
(45) Date of Patent: Jun. 15, 2021

(54) COLOR CHART DEVICE WITH HAIR CLIP AND METHOD FOR IDENTIFYING COLORS

(71) Applicant: Henkel AG & Co. KGaA, Duesseldorf (DE)

(72) Inventor: Annika Koenen, Grevenbroich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 72 days.

(21) Appl. No.: 16/091,188

(22) PCT Filed: Mar. 14, 2017

(86) PCT No.: PCT/EP2017/055928
§ 371 (c)(1),
(2) Date: Oct. 4, 2018

(87) PCT Pub. No.: WO2017/178177
PCT Pub. Date: Oct. 19, 2017

(65) Prior Publication Data
US 2019/0162598 A1    May 30, 2019

(30) Foreign Application Priority Data
Apr. 15, 2016   (DE) .................... 10 2016 206 368.5

(51) Int. Cl.
*G01J 3/52*       (2006.01)
*A45D 44/00*     (2006.01)
*G01J 3/50*       (2006.01)
(52) U.S. Cl.
CPC .............. *G01J 3/52* (2013.01); *A45D 44/005* (2013.01); *G01J 3/50* (2013.01); *A45D 2044/007* (2013.01)

(58) Field of Classification Search
CPC .. G01J 3/52; G01J 3/50; A45D 44/005; A45D 2044/007
See application file for complete search history.

(56) References Cited

U.S. PATENT DOCUMENTS 6,357,052 B1 *   3/2002   Fleming ................. A42B 1/004
                                                                2/209.13
2002/0129828 A1 *  9/2002  Ott ........................... A45D 8/30
                                                                132/148

(Continued)

FOREIGN PATENT DOCUMENTS

WO   2004056135 A1   7/2004
WO   2011089094 A1   7/2011

OTHER PUBLICATIONS

EPO, International Search Report and Written Opinion issued in International Application No. PCT/EP2017/055928, dated Jul. 7, 2017.

(Continued)

*Primary Examiner* — Hwa Andrew Lee
(74) *Attorney, Agent, or Firm* — Lorenz & Kopf, LLP

(57) ABSTRACT

According to various embodiments, a chromaticity diagram device (100, 300, 500) may have the following: a chromaticity diagram (102) which has a plurality of mutually different reference colors (102*a*, 102*b*, 102*c*), wherein the chromaticity diagram (102) has a transparent or translucent recognition region, by means of which a color of a hair tuft can be captured; and a hair clip device (106) attached to the chromaticity diagram (102) or integrally formed on the chromaticity diagram (102), which hair clip device is arranged to clamp a hair tuft to be captured in its hair color to the recognition region.

16 Claims, 15 Drawing Sheets

(56) References Cited

U.S. PATENT DOCUMENTS

2004/0179101 A1* 9/2004 Bodnar ............... G01J 3/02
                                                348/188
2009/0196496 A1* 8/2009 Kalla ................ A45D 44/005
                                                382/165

OTHER PUBLICATIONS

Anonymous: "Amazon.com: 6pc Felt Hair Clip Set : Rainbow, Bird, and Cupcake Handmade Clips for Baby and Girls: Clothing", Feb. 26, 2016, XP055386253, URL: https://www.amazon.com/Rainbow-Cupcake-Handmade-Clips-Girls/dp/B01C9TJP7S/ref=sr_1_11?ie=UTF8&qid=1498664037&sr=8-11&keywords=hair+clip+rainbow; pp. 1-3; retrieved on Jun. 28, 2017.

Anonymous: "Amazon.com: LCLHB Toddler Small Rhinestone Flower Bow Partially Lined Alligator Clip 12 Pack: Clothing", Aug. 16, 2015, XP055386256, URL: https://www.amazon.com/LCLHB-Toddler-R hinestone-Partially-Alligator/dp/B0140PSOC A/ref=sr 1 18?ie=UTF8&qid=I498664192&sr=8-18&keywords=hair+clip+rainbow; pp. 1-3; retrieved on Jun. 28, 2017.

\* cited by examiner

COLOR CHART DEVICE WITH HAIR CLIP AND METHOD FOR IDENTIFYING COLORS

CROSS-REFERENCE TO RELATED APPLICATION

This application is a U.S. National-Stage entry under 35 U.S.C. § 371 based on International Application No. PCT/EP2017/055928, filed Mar. 14, 2017 which was published under PCT Article 21(2) and which claims priority to German Application No. DE 10 2016 206 368.5, filed Apr. 15, 2016, which are all hereby incorporated in their entirety by reference.

TECHNICAL FIELD

The present disclosure relates to a chromaticity diagram device and a method for color recognition.

BACKGROUND

In general, chromaticity diagrams can be used to clearly, reliably and precisely determine the color of an object to be recognized in different lighting environments. Thus, the color of an object that is perceived as a not-too-saturated "orange" in a dark environment is perceived as "brown" in a very bright environment. In a green environment, the color appears as "reddish brown", in the red environment as "golden brown". For this purpose, the chromaticity diagram has a plurality of color fields on the basis of which influences of the specific lighting environment can be corrected.

In the field of hair coloring, conventional chromaticity diagrams are used to recognize the respective hair color of the hair to be dyed and to find a suitable hair dye based on the recognized color. If the color recognition is computer-aided, it is conventionally necessary to capture a digital image of the hair, which is evaluated.

The better the digital image reproduces the present situation, the more reliably and precisely the hair color can be recognized. For example, shadows and/or motion blur may affect the accuracy of color recognition. This can result in the dyed hair not having the desired color, which is often difficult or impossible to correct. A correction can cause additional and irreversible damage to the hair structure. For example, a second dyeing process may be required that additionally loads the hair.

According to various embodiments, it has been recognized that recording a suitable image is particularly difficult when the person whose hair is to be dyed records the image himself. For example, the camera can be aligned imprecisely without suitable aids, so that the image only partly reproduces the color chart. Alternatively or additionally, a motion blur may be increased since the person must simultaneously hold the chromaticity diagram and the camera and/or intuitively align the head with the camera.

Even when the camera has a display (e.g., in the case of a mobile phone with front camera) that is arranged on the side of the lens, so that the person recognizes the image section to be recorded on the display, any shadows and/or motion blur can thus not be recognized or only recognized with difficulty and therefore hardly reduced. In particular, a display requires the head to be aligned with the camera. Further, to use the display of a mobile phone, it is often necessary to accept the use of the inferior front camera, which further reduces the picture quality. For example, the front camera may have a lower resolution and/or a lower light efficiency than the rear camera.

According to various embodiments, there is provided a chromaticity diagram device and method, by means of which reliable and accurate color recognition is facilitated. The tendency to motion blur, inaccurate positioning of the chromaticity diagram and/or shadowing is clearly reduced. This clearly enhances the quality of the image data on the basis of which the color recognition takes place. A sufficient image quality for precise color recognition can thus be provided by means of the front camera.

A chromaticity diagram (e.g., a color chart) having a clip attached thereto (e.g., a hair clip device) can clearly be provided, which clearly allows the chromaticity diagram to be attached in the hair.

According to various embodiments, the provided chromaticity diagram device and the provided method enable the photographing of the hair or the use of the camera (e.g., a mobile phone having a corresponding application) to be carried out with both hands. In other words, easier handling of the color recognition may be provided. This saves time and effort. Alternatively or additionally, the measurement result can be reduced by falsifying motion blur, since the camera can be held positionally secure.

For example, adjusting the position and/or orientation of the camera may be facilitated. This may make it possible, in the case of a mobile phone, to use the rear camera to capture the image data, which may, e.g., have a higher resolution than its opposite front camera. This can improve the image data.

Alternatively or additionally, a shadowing due to the chromaticity diagram (e.g., due to the passage opening) can be reduced. For this purpose, the hairs to be recognized (e.g., a hair tuft) can be pressed at least partially through the chromaticity diagram (e.g., through a passage opening of the chromaticity diagram) by means of the hair clip device and/or against the chromaticity diagram. In other words, the hairs can be pressed against the chromaticity diagram (e.g., a passage opening therein), so that shadowing caused by the chromaticity diagram itself is reduced. This can reduce shadows that falsify the measurement result.

BRIEF SUMMARY

According to various embodiments, a chromaticity diagram device (may also be referred to as color recognition aid) has the following: a chromaticity diagram which has a plurality of mutually different reference colors, wherein the chromaticity diagram has a transparent or translucent recognition region by means of which a color of a hair tuft can be captured; and a hair clip device attached to the chromaticity diagram or integrally formed on the chromaticity diagram, which is arranged to clamp a hair tuft to be captured in its hair color at the recognition region.

According to various embodiments, the chromaticity diagram may be configured sheet-like or at least have a sheet-like section. In some embodiments, the chromaticity diagram (e.g., the at least one sheet-like section) may be curved or at least have a curved section. Alternatively or additionally, the chromaticity diagram (e.g., the at least one sheet-like section) may be planar or at least have a planar section.

According to various embodiments, the reference colors of the chromaticity diagram may differ from each other in their color valence, their spectral composition and/or brightness (may also be referred to as brightness value).

According to various embodiments, the chromaticity diagram may have a plurality of reference color fields, each of which has a reference color and/or which differ in their color valence, their spectral composition, and/or brightness.

The color valence, the spectral composition and/or the brightness can describe the properties of reflected light of the chromaticity diagram. Several different spectral distributions can be assigned the same color valence. If spectral distributions are divided into classes, which in each case summarize the spectral distributions perceived as the same color, then the color valence describes a clear identification of these classes. Each color valence may be associated with a color location in a color space (e.g., the HSV color space or the L*a*b* color space). The HSV color space can be spanned by the color value (which can also be referred to as hue), the color saturation (which can also be referred to as saturation) and the brightness value (can also be referred to as value). The L*a*b* color space (also referred to as Lab colors, CIELAB or CIEL*a*b*) describes all perceptible colors. The L*a*b* color space can provide device independence and perception relatedness, that is: Irrespective of the nature of their production or reproduction technique, colors are defined as they are perceived by a normal observer under a reference lighting condition. The L*a*b* color space is standardized in EN ISO 11664-4.

According to various embodiments, the recognition region may have a passage opening. Alternatively or additionally, the recognition region may have a transparent and/or translucent material (e.g., a solid material and/or a gaseous material). The recognition region may then have a transparent or translucent gas (e.g., atmosphere), which is arranged in the passage opening. Alternatively or additionally, the recognition region may have a transparent or translucent solid (e.g., a film).

According to various embodiments, the hair clip device may press in a closed position against the chromaticity diagram, e.g., against an edge of the recognition region.

According to various embodiments, a force (also referred to as a clamping force) that the hair clip device generates may be greater than a weight force of the chromaticity diagram device, so that the chromaticity diagram device is carried on the hair tuft to be recognized (e.g., frictionally).

According to various embodiments, the hair clip device may be movable from a closed position to an open position against a restoring force for receiving the hair tuft. The restoring force may correspond to the clamping force in the closed position.

According to various embodiments, the restoring force in the closed position may be greater than a weight force of the chromaticity diagram device so that the chromaticity diagram device is carried on the hair tuft to be recognized.

According to various embodiments, the hair clip device may have a resilient material and/or a resilient section which effects the restoring force.

According to various embodiments, the hair clip device may have a leg spring which effects the restoring force. The leg spring may couple at least one leg of the hair clip device to the chromaticity diagram and/or another leg of the hair clip device.

According to various embodiments, a force with which the hair clip device clamps (e.g., presses against the chromaticity diagram) may be greater than the weight force of the chromaticity diagram device, so that the chromaticity diagram is carried by means of the hair clip device on the hair tuft to be recognized.

According to various embodiments, the chromaticity diagram may have at least one optical position recognition mark (e.g., reference mark and/or authentication mark) for recognizing the position of the chromaticity diagram.

According to various embodiments, the hair clip device may have two legs which press against each other in a closed position.

According to various embodiments, the hair clip device may have at least one moveably mounted leg which is movable for receiving the hair tuft in the open position.

According to various embodiments, the hair tuft (e.g., a hair bundle, a hair strand, or a hair lock) may have or be formed from a plurality of fibers (e.g., a bundle of multiple fibers). The fibers (may also be referred to as threads) may be arranged aligned to one another (i.e., ordered, e.g., regular and/or combed) or random (e.g., irregular). The fibers may have or be formed from an organic material (e.g., keratin, e.g., horn). The hair tuft can, e.g., have or be formed from a plurality of keratin fibers (which can also be referred to as hair, horn fibers or hair fibers, e.g., natural hair). Alternatively or additionally, the fibers may have or be formed from a plastic (e.g., a polymer).

According to various embodiments, color recognition may be performed while the hair tuft is connected to a person (clearly, e.g., on the head).

According to various embodiments, a method for color recognition may have the following: self-supporting (e.g., frictionally and/or positively locking) attachment to a chromaticity diagram device to a hair tuft to be recognized; performing an optical color recognition of the hair tuft using the chromaticity diagram device.

According to various embodiments, a method for color recognition by means of a chromaticity diagram device which has a chromaticity diagram and a hair clip device attached to the chromaticity diagram or integrally formed on the chromaticity diagram may have the following: clamping (e.g., clamping, i.e., holding frictionally) a hair tuft to be recognized by means of the hair clip device; performing an optical color recognition of the hair tuft using the chromaticity diagram device.

According to various embodiments, the clamping may have pressing the hair tuft to be captured against the chromaticity diagram (e.g., against an edge of the chromaticity diagram device).

According to various embodiments, the clamping may be such that the chromaticity diagram device is carried against its weight on the hair tuft to be recognized (e.g., in a fixed position). For example, the clamping can be done with a clamping force (can also be referred to as a contact force), which is arranged such that the chromaticity diagram device is held frictionally on the hair tuft to be recognized.

According to various embodiments, performing the optical color recognition may have capturing image data of the chromaticity diagram and the hair tuft on the basis of which the optical color recognition is performed.

According to various embodiments, the method may further have the following: Determining a coloring agent (may also be referred to as a colorant or dye) based on the color recognition, which causes a color change (of the hair tuft) according to a specification by application to the hair tuft.

According to various embodiments, the coloring agent may have a secondary color which, in a subtractive color overlay with the hair tuft, gives a predefined combination color.

According to various embodiments, the color recognition may be performed by means of a mobile device.

According to various embodiments, the method may have: Capturing image data which represents the recognition region and/or the hair tuft to be recognized.

According to various embodiments, performing the color recognition may have determining a color of the hair tuft based, e.g., on the image data.

According to various embodiments, performing the color recognition may have comparing a color (may also be referred to as color valence) of the hair tuft with the chromaticity diagram, e.g., with one or more reference colors of the chromaticity diagram. Based on the comparison, a correction information can be determined, which represents a color falsification of the hair tuft and/or the reference colors.

According to various embodiments, performing the color recognition may have determining a location (i.e., position and/or orientation) of the chromaticity diagram device based on at least one position recognition mark of the chromaticity diagram device.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1A:
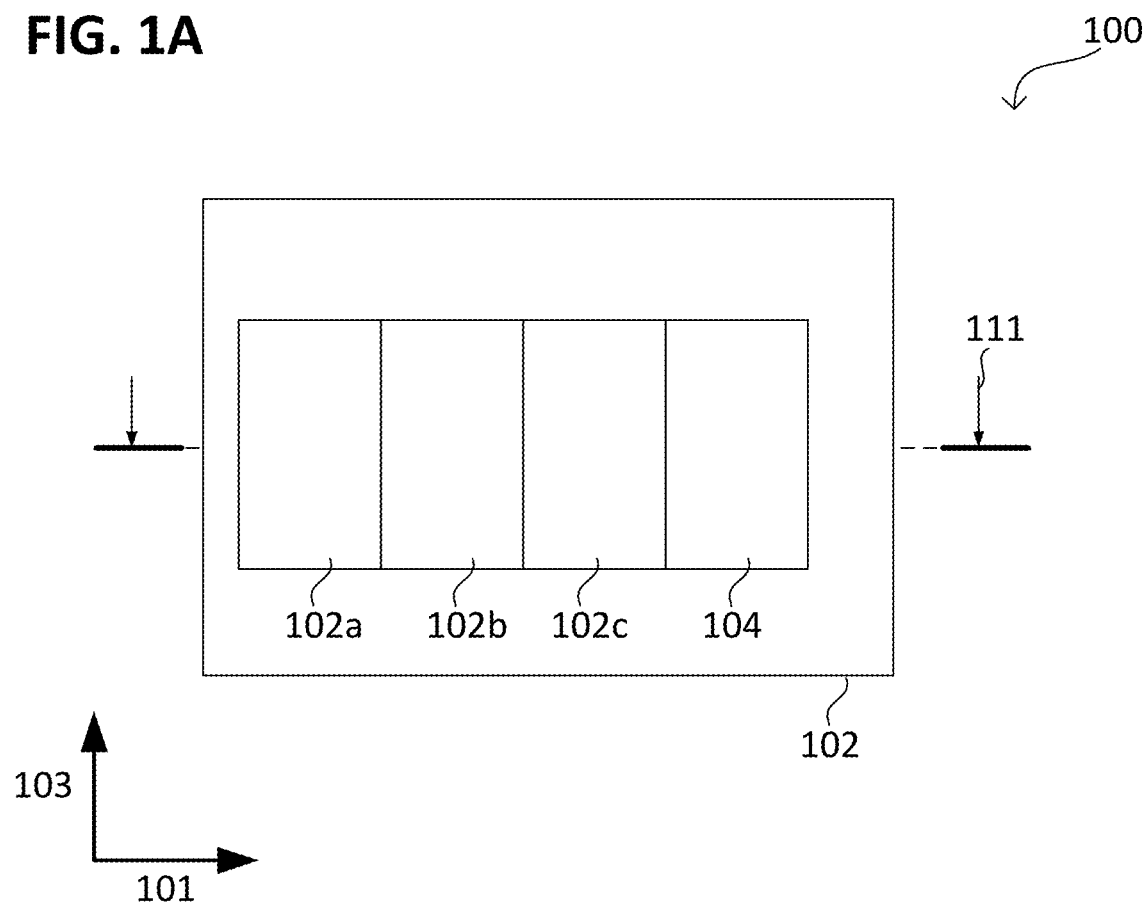
FIGS. 1A and 1B each show a chromaticity diagram device according to various embodiments in various schematic views.

The following detailed description is merely exemplary in nature and is not intended to limit the disclosure or the application and uses of the subject matter as described herein. Furthermore, there is no intention to be bound by any theory presented in the preceding background or the following detailed description.

In the following detailed description, reference is made to the accompanying drawings, which form a part hereof, and in which is shown by way of illustration specific embodiments in which the present disclosure may be practiced. In this regard, directional terminology such as "top", "bottom", "front", "back", etc. is used with reference to the location of the figure(s) described. Since components of embodiments can be positioned in a number of different positions, the directional terminology is illustrative and not limiting in any way. It should be understood that other embodiments may be utilized and structural or logical changes may be made without departing from the scope of the present disclosure. It should be understood that the features of the various exemplary embodiments described herein may be combined with each other unless specifically stated otherwise. The following detailed description is therefore not to be considered in a limiting sense, and the scope of the present disclosure is defined by the appended claims.

As used herein, the terms "connected" and "coupled" are used to describe both direct and indirect connection, and direct or indirect coupling. Identical or similar elements are provided with identical reference numerals, as appropriate in the figures.

According to various embodiments, the use of one of the color capture application (may also be referred to as a color capture app) may be provided to capture the hair color of the consumer (a person). The color capture application may be arranged to process image data. For example, a photograph (of the hair) may be taken to capture the image data.

To capture the image data (to clearly photograph one's own hair), a conventional color chart must be held with one hand and the photo must be taken with the other hand. This can make it difficult to capture the hairline, as this may require exact positioning and/or alignment of the color chart. Furthermore, the conventional color chart may slip upon capturing the image data, which may degrade the image data due to motion blur and/or may result in unusable image data, e.g., if this does not fully reproduce the color chart. The capture of the image data by means of a conventional color chart can be particularly difficult when no display is arranged on the side of the camera, e.g., when a camera has no display and/or the mobile phone (e.g., a smart phone) has no front camera. Furthermore, a conventional color chart can only rest on the hair, which increases the shadowing, e.g., due to a hole (can also be referred to as a passage opening) of the color chart. These shadows can falsify the measurement result.

Figure 1B:
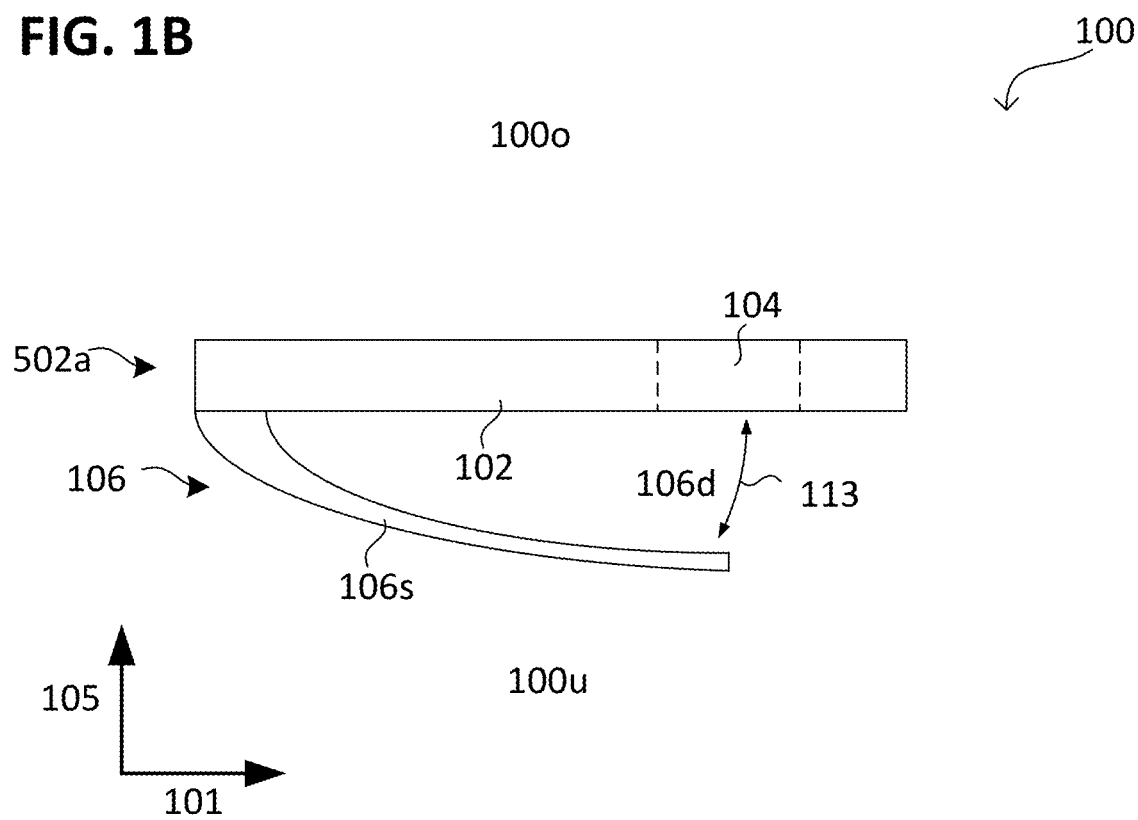

FIG. 1A illustrates a chromaticity diagram device 100 according to various embodiments in a schematic plan view (e.g., on a first side 100o of the chromaticity diagram device 100) and FIG. 1B illustrates the chromaticity diagram device 100 in a schematic cross-sectional view (e.g., in the cross section 111) or side view (e.g., along direction 103).

According to various embodiments, the chromaticity diagram device 100 (may also be referred to as color recognition aid) may have a chromaticity diagram 102. The chromaticity diagram 102 may have a plurality of mutually different reference colors 102a, 102b, 102c (e.g., three or more than three). For example, the chromaticity diagram 102 may have a plurality of color fields (may also be referred to as reference color fields) that differ in their color. Each reference color field may have or be formed from one of the reference colors 102a, 102b, 102c.

The reference colors 102a, 102b, 102c may be arranged on a first side 100o of the chromaticity diagram device 100 (clearly a top side 100o). For example, the chromaticity diagram 102 may have a sheet-like support 502a (also referred to as a surface element, e.g., a card) on which the reference colors 102a, 102b, 102c are arranged. The support 502a may be flat, e.g., plate-shaped, as illustrated in FIG. 1A and FIG. 1B. Alternatively or additionally, the sheet-like support 502a may have a curved section or be formed from it or be shaped differently.

According to various embodiments, the chromaticity diagram device 100 may have a transparent or translucent recognition region 104. A color of a hair tuft can be captured by means of the recognition region 104. The recognition region 104 may extend from the first side 100o of the chromaticity diagram device 100 to a second side 100u of the chromaticity diagram device 100 (clearly a bottom side 100u), e.g., through the sheet-shaped support 502a of the chromaticity diagram 102.

Furthermore, the chromaticity diagram device 100 has a hair clip device 106 attached to the chromaticity diagram 102. The hair clip device 106 may be arranged on the second side 100u of the chromaticity diagram 102. The second side 100u of the chromaticity diagram 102 may lie opposite the first page 100o of the chromaticity diagram 102. The hair clip device 106 may be arranged to clamp a hair tuft, e.g., such that it is visible through the recognition region 104.

According to various embodiments, the recognition region 104 may have a passage opening. Alternatively or additionally, the recognition region 104 may have a transparent or translucent solid, e.g., a transparent or translucent film.

According to various embodiments, the hair clip device 106 may be brought from a closed position to an open position for opening 113 against a restoring force (illustrated in FIG. 1B). In the open position, a hair tuft may be inserted into the chromaticity diagram device 100 (e.g., between the hair clamp device 106 and the chromaticity diagram 102).

For example, the hair clip device 106 may have at least one leg 106s which may be moved away from the chromaticity diagram 102 (e.g., its recognition region 104) to open it 113 against the restoring force. Thus, a gap 106d may be formed, into which the hair tuft (e.g., coupled with a person) may be inserted between the leg 106s of the hair clip device 106 and the chromaticity diagram 102 (e.g., its recognition region 104). Clearly, the hair clip device 106 may couple the hair tuft e.g., to the person.

The leg 106s of the hair clip device 106 may be attached to the chromaticity diagram 102. For example, the leg 106s of the hair clip device 106 may be arranged resilient and/or resiliently attached to the chromaticity diagram 102. For example, the leg 106s of the hair clip device 106 or a section thereof may have or be formed from a resilient material, e.g., a resilient plastic (e.g., an elastomer). Thus, the restoring force can be generated by the leg 106s of the hair clip device 106. A spring constant of the leg 106s (if present) may be less than a spring constant of the chromaticity diagram 102.

Figure 2A:
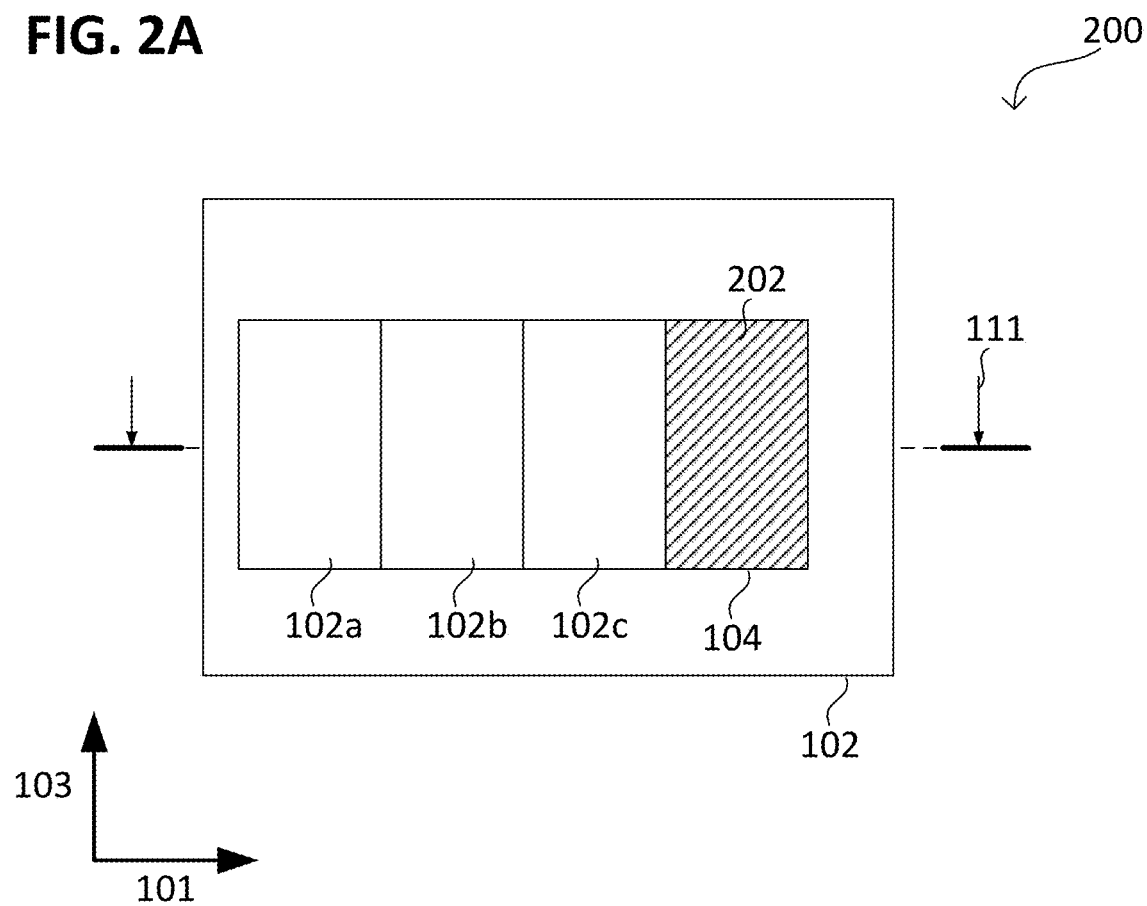
FIGS. 2A and 2B each show a chromaticity diagram device according to various embodiments in various schematic views.
Figure 2B:
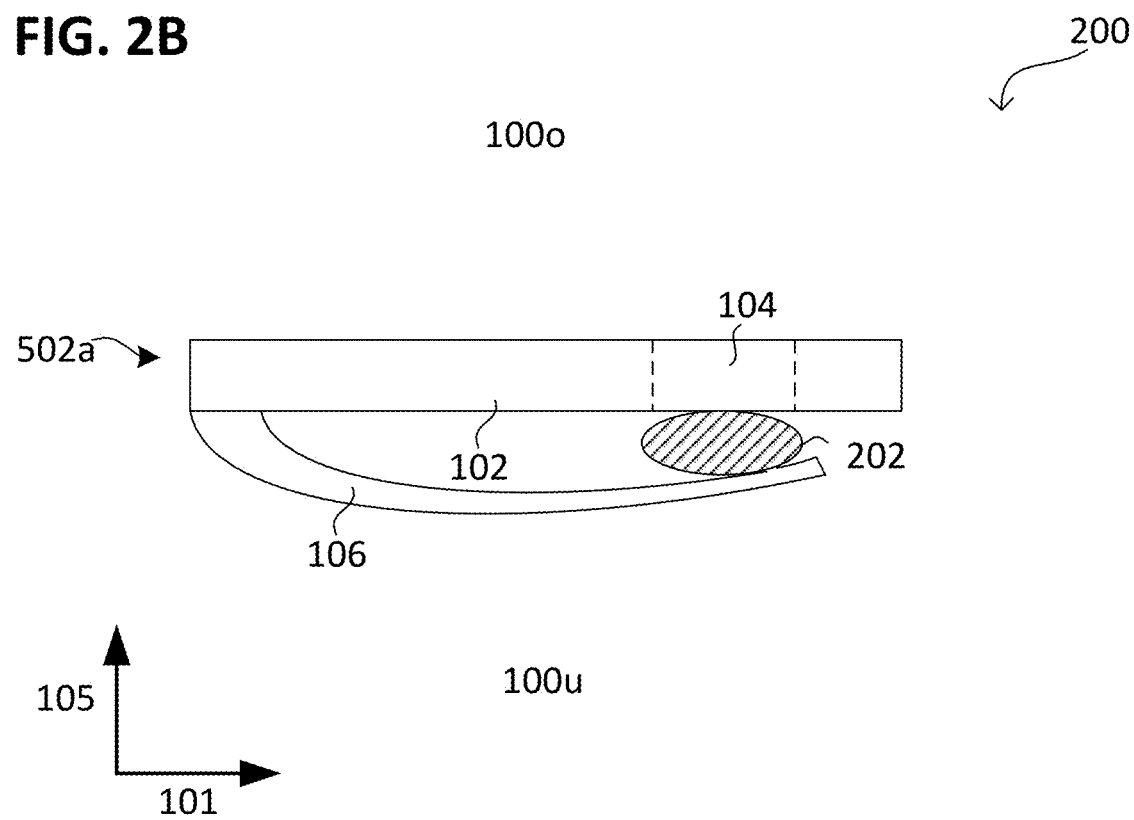

FIG. 2A illustrates a chromaticity diagram device 200 according to various embodiments in a schematic plan view and FIG. 2B illustrates the chromaticity diagram device 200 in a schematic cross-sectional view (e.g., in the cross section 111) or side view (e.g., along the direction 103), e.g., the chromaticity diagram device 100 in a clamping position.

According to various embodiments, the hair clip device 106 may be brought into a clamping position by means of the restoring force for closing 113 (illustrated in FIG. 2B). The clamping position can be clearly between the closed position and the open position.

According to various embodiments, in the closed position, the hair clip device may press against the chromaticity diagram 102 (e.g., the recognition region 104) (e.g., if no hair tuft 202 is inserted). If a hair tuft 202 is inserted into the chromaticity diagram device 200, the hair clip device 106 in the clamping position may press the hair tuft 202 against the chromaticity diagram 102 (e.g., the recognition region 104). A distance of the hair tuft 202 from the recognition region 104 can thus be reduced, which reduces the shadowing. Clearly, the hair tuft pressed against the chromaticity diagram 102 can rest on the chromaticity diagram 102.

Figure 3A:
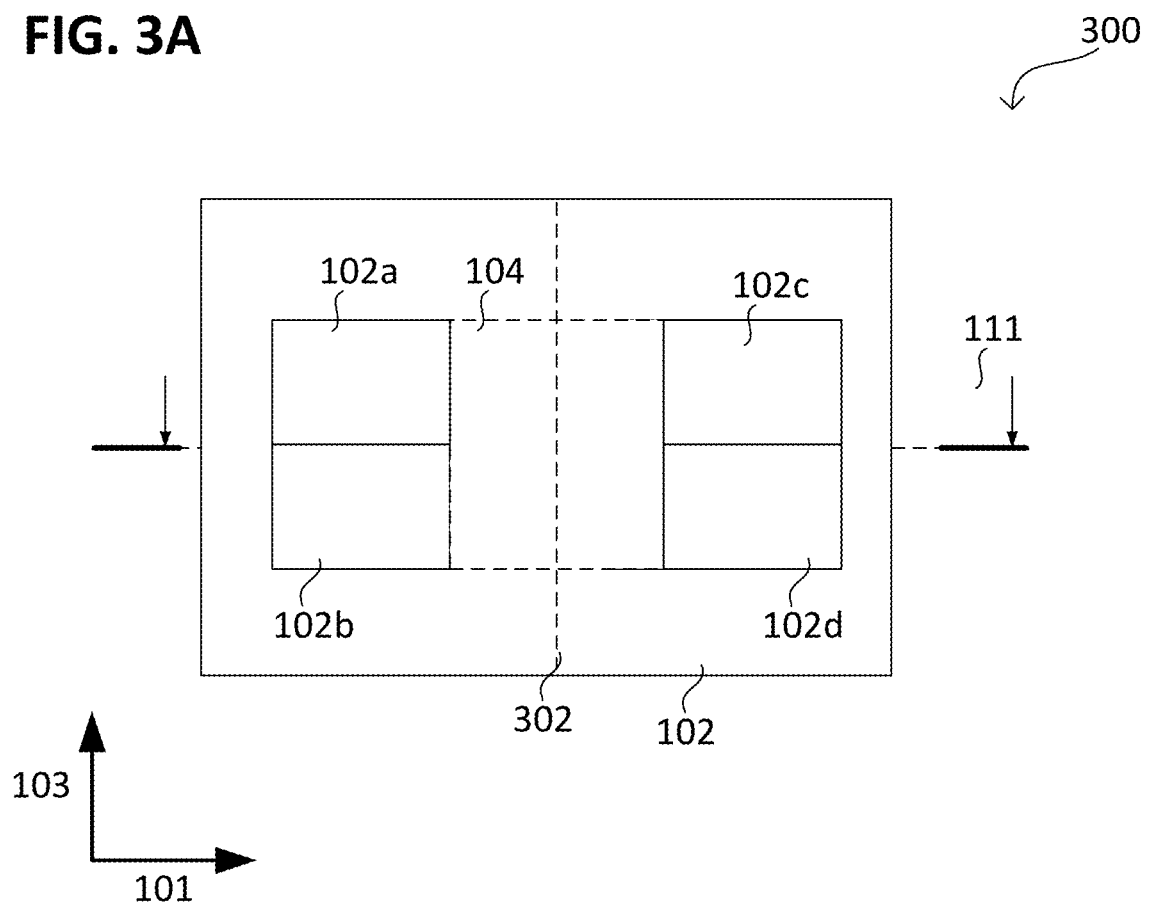
FIGS. 3A and 3B each show a chromaticity diagram device according to various embodiments in various schematic views.
Figure 3B:
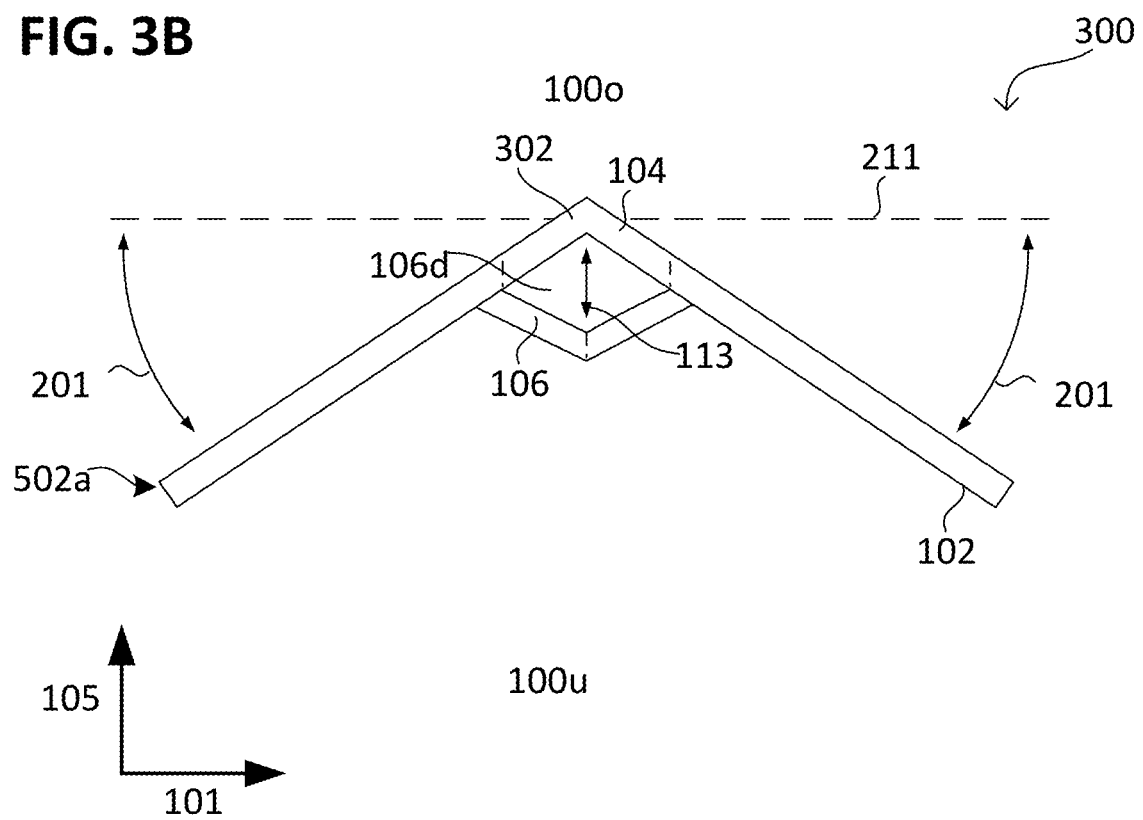

FIG. 3A illustrates a chromaticity diagram device 300 according to various embodiments in a schematic plan view and FIG. 3B illustrates the chromaticity diagram device 300 in a schematic cross-sectional view (e.g., in the cross section 111) or side view (e.g., along direction 103).

The chromaticity diagram device 300 may be similar to the chromaticity diagram device 100, 600, 200, 400, 500, 500a, 500b, 500c, 700, 1304, 1400 described herein.

The chromaticity diagram device 300 may have a plurality of mutually different reference colors 102a, 102b, 102c, 102d (e.g., four or more than four).

The chromaticity diagram device 300 may have a hair clip device 106 integrally formed on the chromaticity diagram 102. For example, the hair clip device 106 may be part of the sheet-like support 502a of the chromaticity diagram 102.

For example, the chromaticity diagram 102 may have a fold region 302 in which the chromaticity diagram 102 is arranged foldably. For example, the hair clip device 106 may be arranged so that it can be brought into the open position by folding the chromaticity diagram 102 (illustrated in FIG. 3B). In the open position, a gap 106d can be formed in the chromaticity diagram device 300. The gap 106d may be arranged to receive a hair tuft. Clearly, the hair clip device 106 may have or be formed with a tab in the open position. For example, the tab may be formed from the chromaticity diagram 102 (e.g., the card).

In the closed position, e.g., the hair clip device 106 may lie, for example, in a plane 211 with the fold region 302, e.g., in the recognition region 104. By means of folding 201 of the chromaticity diagram 102, the hair clip device 106 can be moved out of the plane 211 or the recognition region 104, so that a passage opening forms in the recognition region 104.

Optionally, the hair clip device 106 may have or be formed from a spring (e.g., a leg spring), which upon deflection of the chromaticity diagram device 300, generates the restoring force from the closed position. Alternatively or additionally, a spring may be arranged on the fold region 302, e.g., in physical contact with the fold region 302. Alternatively or additionally, the hair clip device 106 and/or the chromaticity diagram 102 (e.g., in its fold region 302) may have or be formed from a resilient material, e.g., a spring-elastic polymer.

Figure 4A:
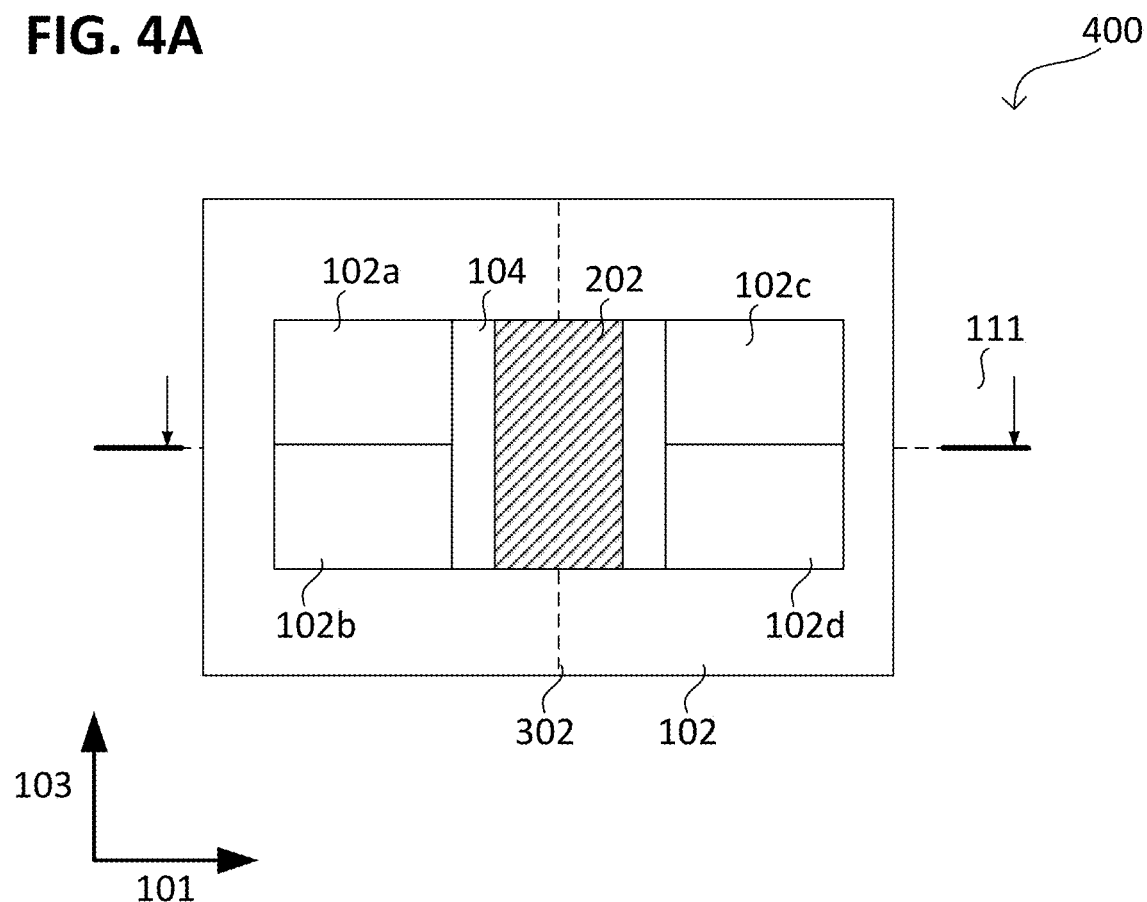
FIGS. 4A and 4B each show a chromaticity diagram device according to various embodiments in various schematic views.
Figure 4B:
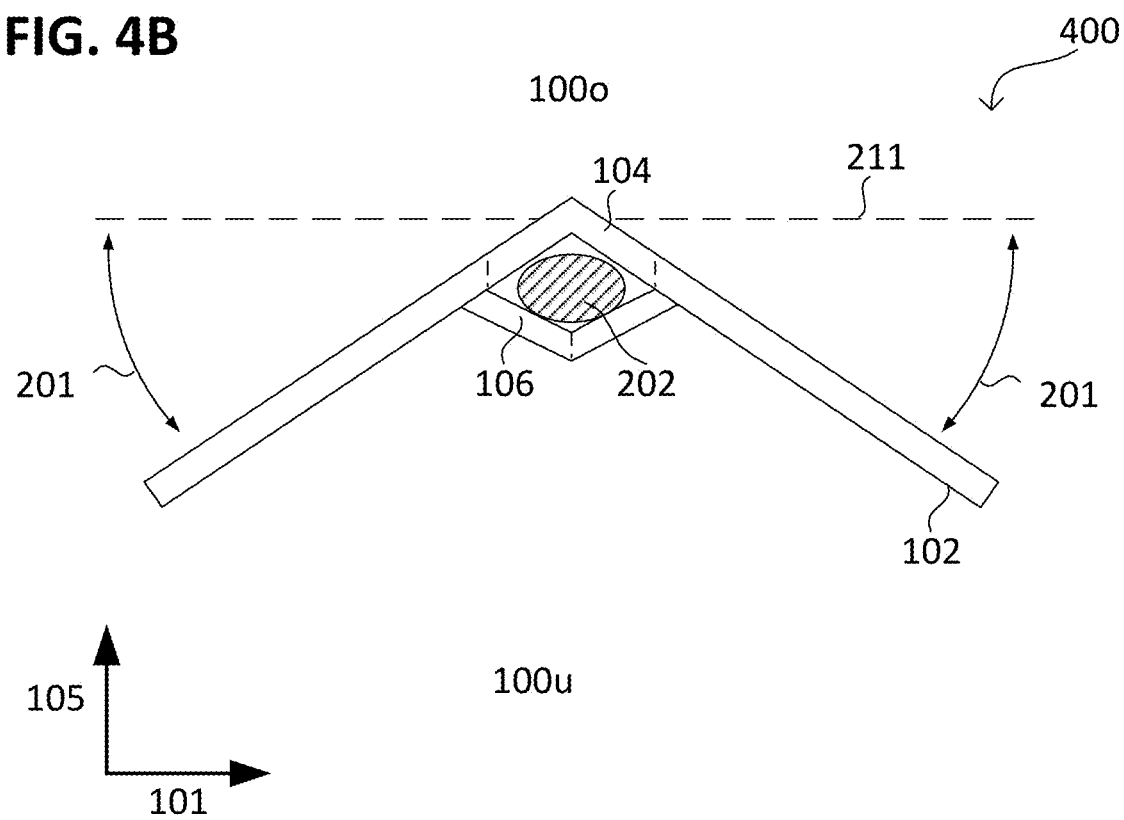

FIG. 4A illustrates a chromaticity diagram device 400 according to various embodiments in a schematic plan view and FIG. 4B illustrates the chromaticity diagram device 400 in a schematic cross-sectional view (e.g., in the cross section 111) or side view (e.g., along the direction 103), e.g., the chromaticity diagram device 300 with inserted hair tuft 202.

If a hair tuft 202 is inserted in the chromaticity diagram device 400, the hair clip device 106 can press the hair tuft 202 against the chromaticity diagram 102 in the clamping position, (e.g., the recognition region 104). A distance of the hair tuft 202 from the recognition region 104 can thus be reduced, which reduces the shadowing.

Figure 5A:
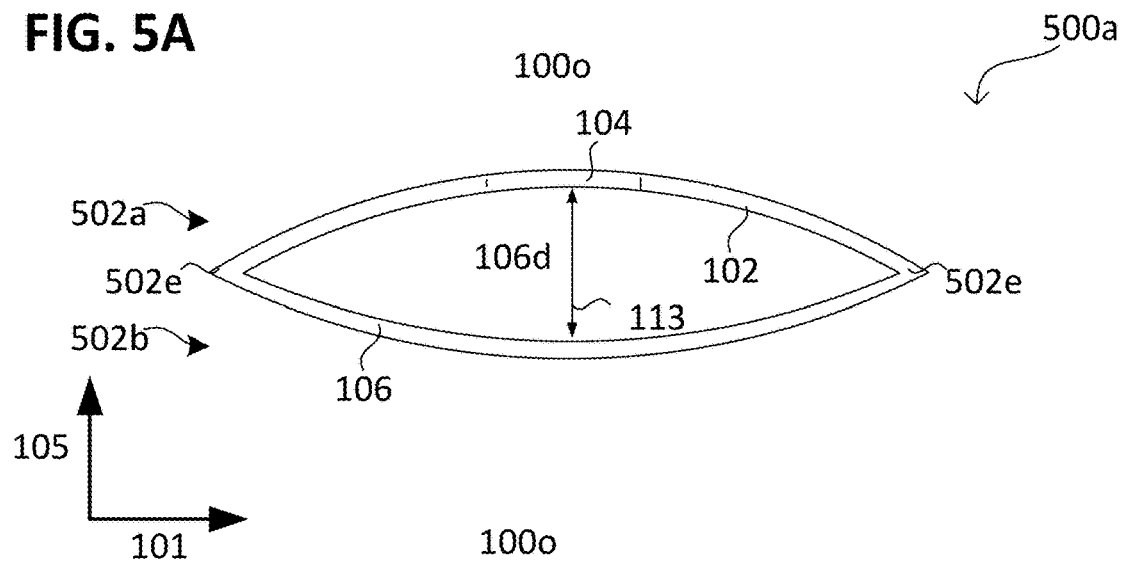
FIGS. 5A to 5C each show a chromaticity diagram device according to various embodiments in a schematic cross-sectional view.
Figure 5B:
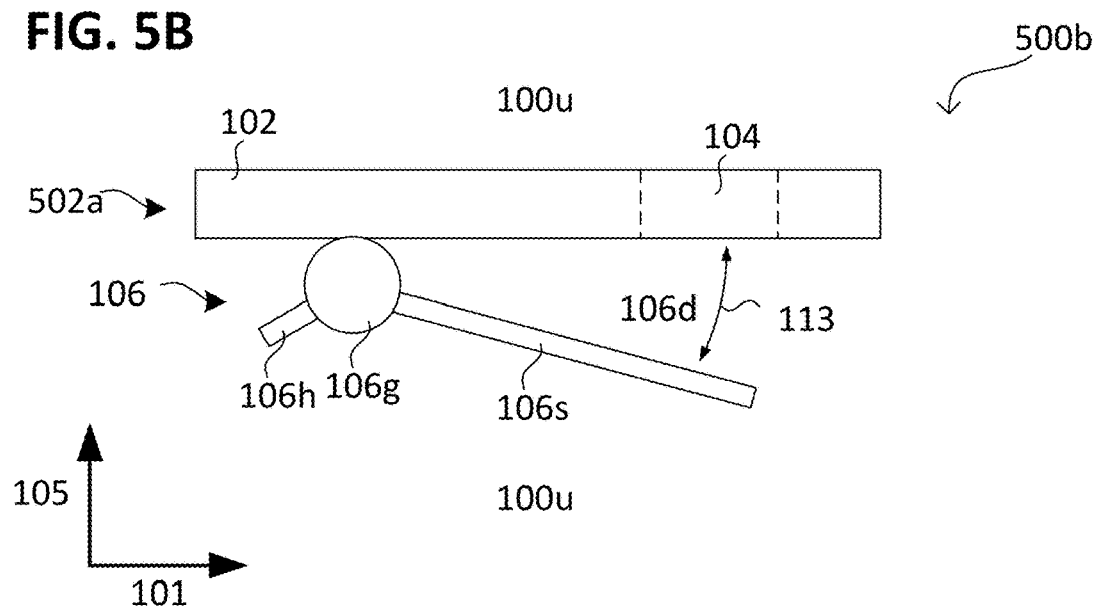
Figure 5C:
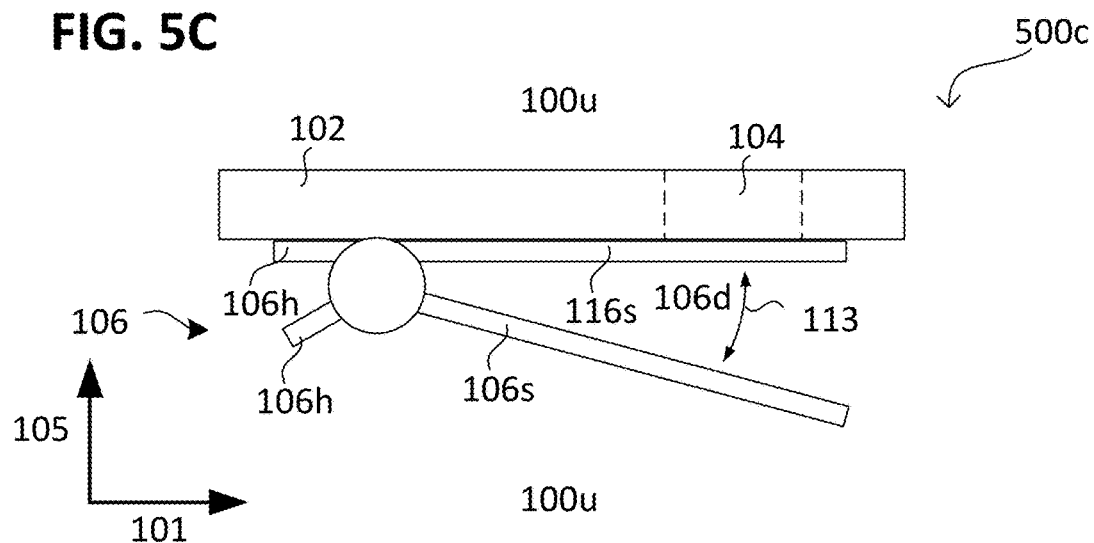

FIG. 5A to FIG. 5C respectively illustrate a chromaticity diagram device 500 (a to c) according to various embodiments in a schematic cross-sectional view (e.g., in the cross section 111) or side view (e.g., along the direction 103).

The chromaticity diagram 102 of the chromaticity diagram device 500a may have a first (e.g., sheet-like) support 502a and the hair-clip device 106 of the chromaticity diagram device 500a may have a second (e.g., sheet-like) support 502b, which are connected to each other at their end sections 502e, e.g., monolithically. The first support 502a and the second support 502b may be curved, e.g., by moving the end sections 502e towards each other, to open 113 the chromaticity diagram device 500a. A hair tuft may be received in the gap 106d formed between the first support 502a and the second support 502b. For example, the first support 502a and the second support 502b may be made of the same resilient material, e.g., a resilient polymer (e.g., an elastomer) and/or in the form of a film.

The chromaticity diagram 102 of the chromaticity diagram device 500b may have a support 502a. The hair clip device 106 of the chromaticity diagram device 500b may have a hinge 106g and a leg 106s which is coupled (e.g., connected) to the chromaticity diagram 102 by means of the hinge 106g. The leg 106s may be pivoted relative to the chromaticity diagram 102 to open 113 the chromaticity diagram device 500a. In other words, the hinge 106g may pivotally support the leg 106s. A hair tuft may be inserted in the gap 106d formed between the chromaticity diagram 102 and the leg 106s. The leg 106s may have a lever 106h projecting beyond the hinge 106g (may also be referred to as a handle 106h), which can facilitate an opening 113 of the chromaticity diagram device 500b (i.e., overcoming the restoring force).

The hair clip device 106 of the chromaticity diagram device 500c may have a first leg 106s and a second leg 116s which are connected to each other by means of the hinge 106g. The second leg 116s may be attached to the chromaticity diagram 102 of the chromaticity diagram device 500b (e.g., glued and/or riveted). For gluing the hair clip device 106 to the chromaticity diagram 102, a pressure-sensitive adhesive (i.e., an adhesive without a solidification mechanism) may alternatively or additionally be used in addition to a hardening adhesive (i.e., an adhesive having a solidification mechanism). For example, a pressure-sensitive adhesive may be applied after application to a support material, such as the chromaticity diagram device 500c and/or the first leg 106s, remain highly viscous and permanently tacky and form a permanent connection with the joining of these together.

The first leg 106s can be pivoted relative to the second leg 116s to open 113 the chromaticity diagram device 500a. In other words, the hinge 106g may pivotally support the first leg 106s to the second leg 116s. A hair tuft may be received in the gap 106d formed between the support 502a and the leg 106s. The first leg 106s and the second leg 116s may each have a lever 106h (also may be referred to as a handle 106h) projecting beyond the hinge 106g, which may can facilitate an opening of the chromaticity diagram device 500b. The second leg 116s may stabilize the chromaticity diagram 102. Thus, a greater restoring force can be provided without bending the chromaticity diagram 102. Alternatively or additionally, a thinner chromaticity diagram 102 may be used.

According to various embodiments, the hinge 106g of the chromaticity diagram device 500b and/or the chromaticity diagram device 500c may have a spring (e.g., a leg spring). The spring may be arranged to generate the restoring force. The spring may have or be formed from a resilient material, e.g., spring-elastic metal (e.g., spring steel) and/or a resilient plastic. A spring constant of the spring may be less than a spring constant of a leg 106s, 116s (if present) of the hair clip device 106, and/or a spring constant of the chromaticity diagram 102 (if present).

According to various embodiments, the hair clip device 106 may have a leg spring that generates the restoring force. The leg spring may couple at least one leg 106s of the hair clip device 106 to the chromaticity diagram 102 and/or another leg 116s of the hair clip device 116 (e.g., spring elastic).

Figure 6:
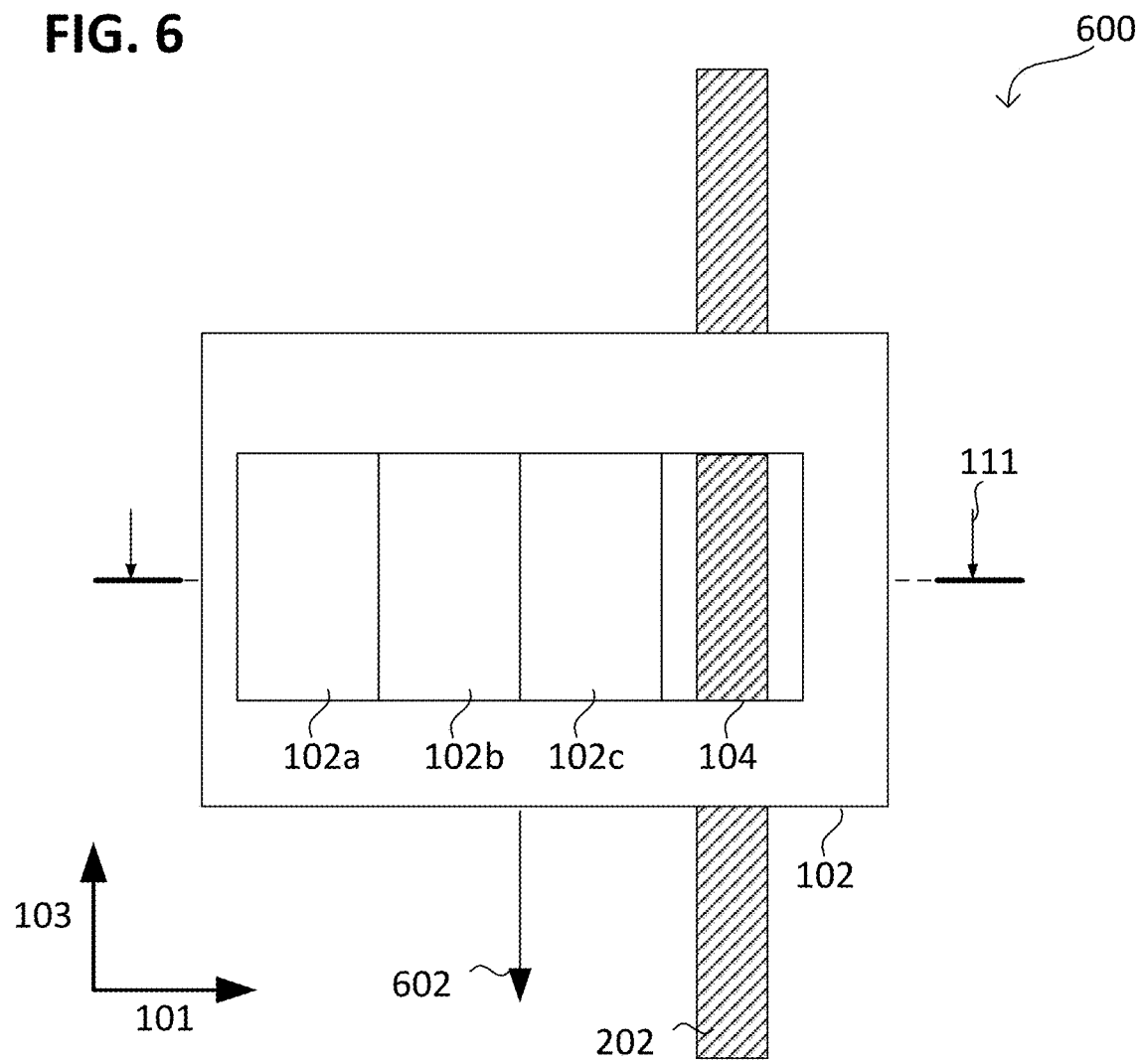
FIG. 6 shows a chromaticity diagram device according to various embodiments in a schematic top view.

FIG. 6 illustrates a chromaticity diagram device 600 according to various embodiments in a schematic plan view (e.g., on a first side 100o of the chromaticity diagram device 600).

According to various embodiments, a force (may also be referred to as a contact force) that the hair clip device 106 generates and/or with which the hair clip device 106 presses against a hair tuft 202 may be greater than a weight force 602 of the chromaticity diagram device 600. Thus, the chromaticity diagram device 600 achieves being carried on the clamped hair tuft 202. Alternatively or additionally, the hair clip device 106 may have one or more teeth (e.g., a toothed profile) that penetrate the clamped hair tuft 202 (so that they clearly hook onto the hair tuft 202). This may improve a clamping action and/or a holding of the chromaticity diagram device 600 on the hair tuft 202.

According to various embodiments, the hair clip device 106 may be biased so that the restoring force of the hair clip device 106 in the closed position is greater than zero. For example, the restoring force of the hair clip device 106 in the closed position may be greater than the weight force 602 of the chromaticity diagram device 600. The restoring force of the hair clip device 106 in the clamped position may be greater than the restoring force of the hair clip device 106 in the closed position.

According to various embodiments, the chromaticity diagram device 600 may be attached by means of the hair clip device 106 to the hair tuft 202, e.g., self-supporting.

Figure 7:
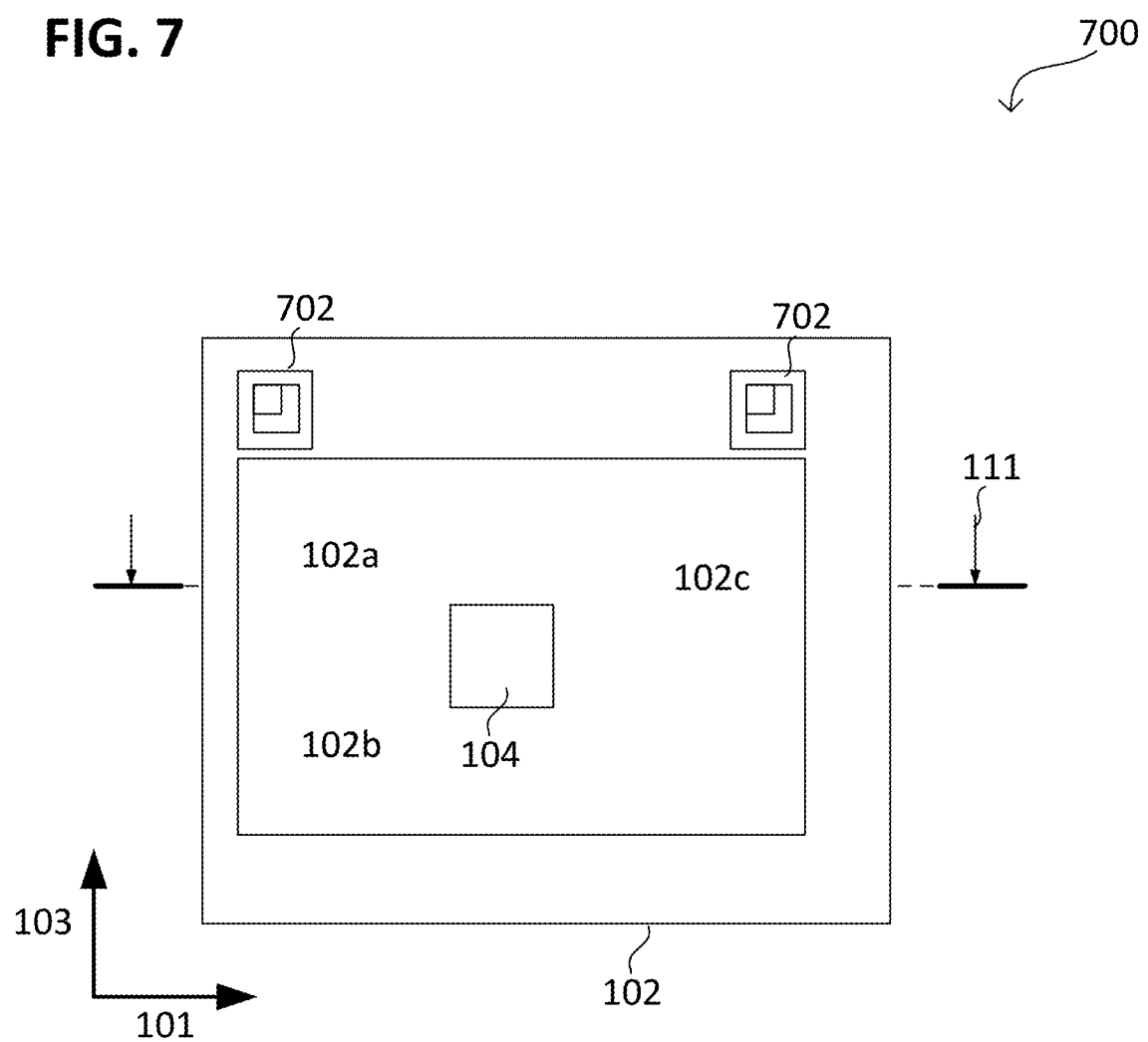
FIG. 7 shows a chromaticity diagram device according to various embodiments in a schematic top view.

FIG. 7 illustrates a chromaticity diagram device 700 according to various embodiments in a schematic plan view (e.g., on a first side 100o of the chromaticity diagram device 700).

According to various embodiments, the chromaticity diagram 102 may have at least one optical position recognition mark 702 (e.g., one, two, three, four, or more than four position recognition marks 702). A color recognition device (e.g., computer-aided) used for color recognition can be arranged to recognize the at least one position recognition mark 702.

Each position recognition mark 702 may have a specific pattern that appears only within the at least one position recognition mark 702. Thus, a unique recognition and/or identification of each position recognition mark 702 can be made possible.

According to various embodiments, the position recognition marks 702 may have symmetry (i.e., be converted into one another by a symmetry operation). For example, the position recognition marks 702 may be arranged at the vertices of a mirror-symmetric polygon (e.g., a rectangle), a chordal polygon, an equilateral polygon, or a regular polygon.

According to various embodiments, at least some (i.e., some or all) reference colors 102a, 102b, 102c may be arranged between the position recognition marks 702 and/or within the polygon. For example, multiple position recognition marks 702 may surround the reference colors 102a, 102b, 102c (may also be referred to as a field boundary).

For example, at least two of the position recognition marks 702 may differ from each other. Thus, an orientation of the chromaticity diagram 102 can be recognized. Alternatively or additionally, at least one corner of the polygon may be free of a position recognition mark 702. Thus, an orientation of the chromaticity diagram 102 can be recognized.

At least one position recognition mark 702 of the chromaticity diagram device 700 may be a reference mark (may also be referred to as a reference mark) or be formed therefrom. The reference mark can represent the local zero point of the position recognition for an incremental encoder of the color recognition device. It corresponds in its function to the zero mark of a scale or the 0° scale line on an optical pitch circle.

Alternatively or additionally, at least one position recognition mark 702 of the chromaticity diagram device 700 may have an authentication mark or be formed from it. The authentication mark may enable an identification of the chromaticity diagram device 700 (e.g., the chromaticity diagram 102). For example, a type of the chromaticity diagram device 700 can be recognized based on the authentication mark. Alternatively or additionally, the authentication mark can enable a clear and individual assignment of the chromaticity diagram 102 (e.g., a serial number).

For example, the chromaticity diagram 102 may have exactly three (e.g., same) position recognition marks 702 on the corners of a rectangle for field limitation (e.g., a fourth corner of the rectangle may be free of a position recognition mark 702 or have a reference mark). The color recognition device can recognize the orientation (i.e., orientation) of the chromaticity diagram 102 by means of the missing position recognition mark 702 or reference mark in the fourth corner. As the number of reference colors 102a, 102b, 102c increases, further position recognition marks 702 may be added to make the orientation of the chromaticity diagram 102 more recognizable.

The relative position of two position recognition marks 702 (which may also be referred to as main position marks) with respect to one another, e.g., their distance from each other, may be correlated to the arrangement of the reference colors 102a, 102b, 102c (e.g., the reference color fields). This makes it easier to recognize the reference colors.

Figure 8:
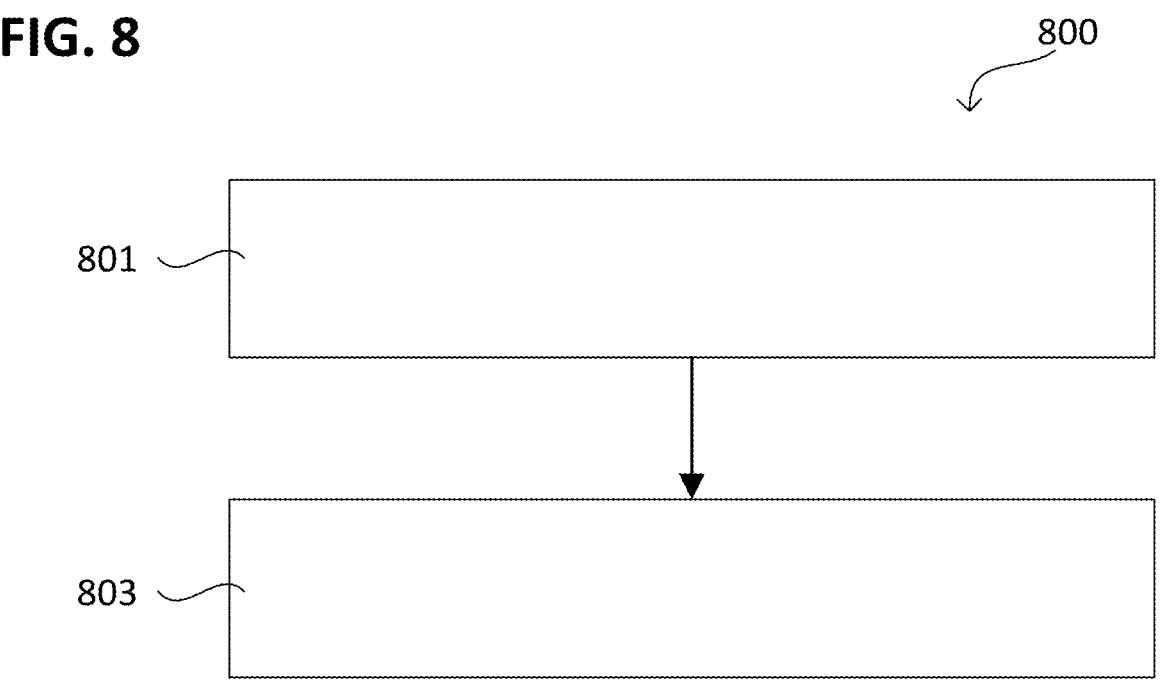
FIG. 8 shows a method according to various embodiments in a schematic flowchart.

FIG. 8 illustrates a method 800 for color recognition according to various embodiments in a schematic flow diagram.

According to various embodiments, the method 800 in 801 may have: self-supporting attaching of a chromaticity diagram device to a hair tuft to be recognized. Alternatively or additionally, the method 800 in 801 may have: frictionally attaching a chromaticity diagram device to a hair tuft to be recognized.

Furthermore, the method 800 in 803 may have: Performing optical color recognition of the hair tuft using the chromaticity diagram device.

The optical color recognition may be arranged as described above.

Figure 9:
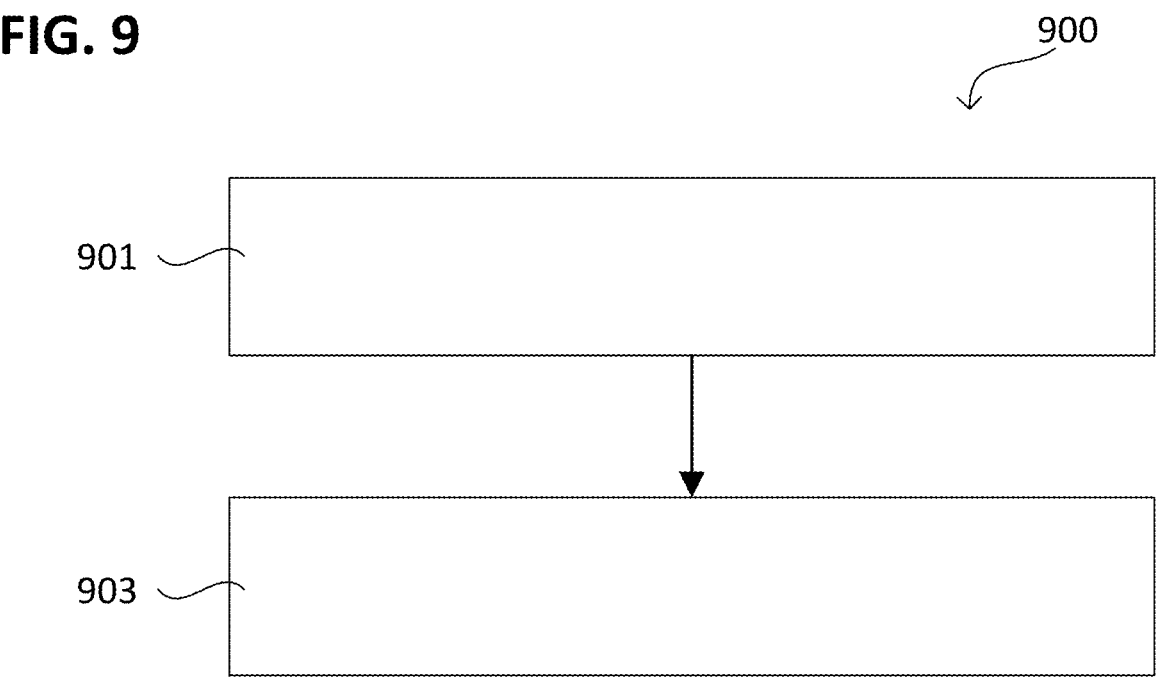
FIG. 9 shows a method according to various embodiments in a schematic flowchart.

FIG. 9 illustrates a method 900 for color recognition according to various embodiments in a schematic flow diagram.

According to various embodiments, the method 900 may be performed by means of a chromaticity diagram device according to various embodiments. The chromaticity diagram device may have at least one chromaticity diagram and a hair clip device attached to the chromaticity diagram or integrally formed on the chromaticity diagram.

According to various embodiments, the method 900 in 901 may have: Clamping a hair tuft to be recognized by means of the hair clip device.

Furthermore, the method 900 in 903 may have: Performing optical color recognition of the hair tuft using the chromaticity diagram device.

The optical color recognition may be arranged as described above.

Figure 10:
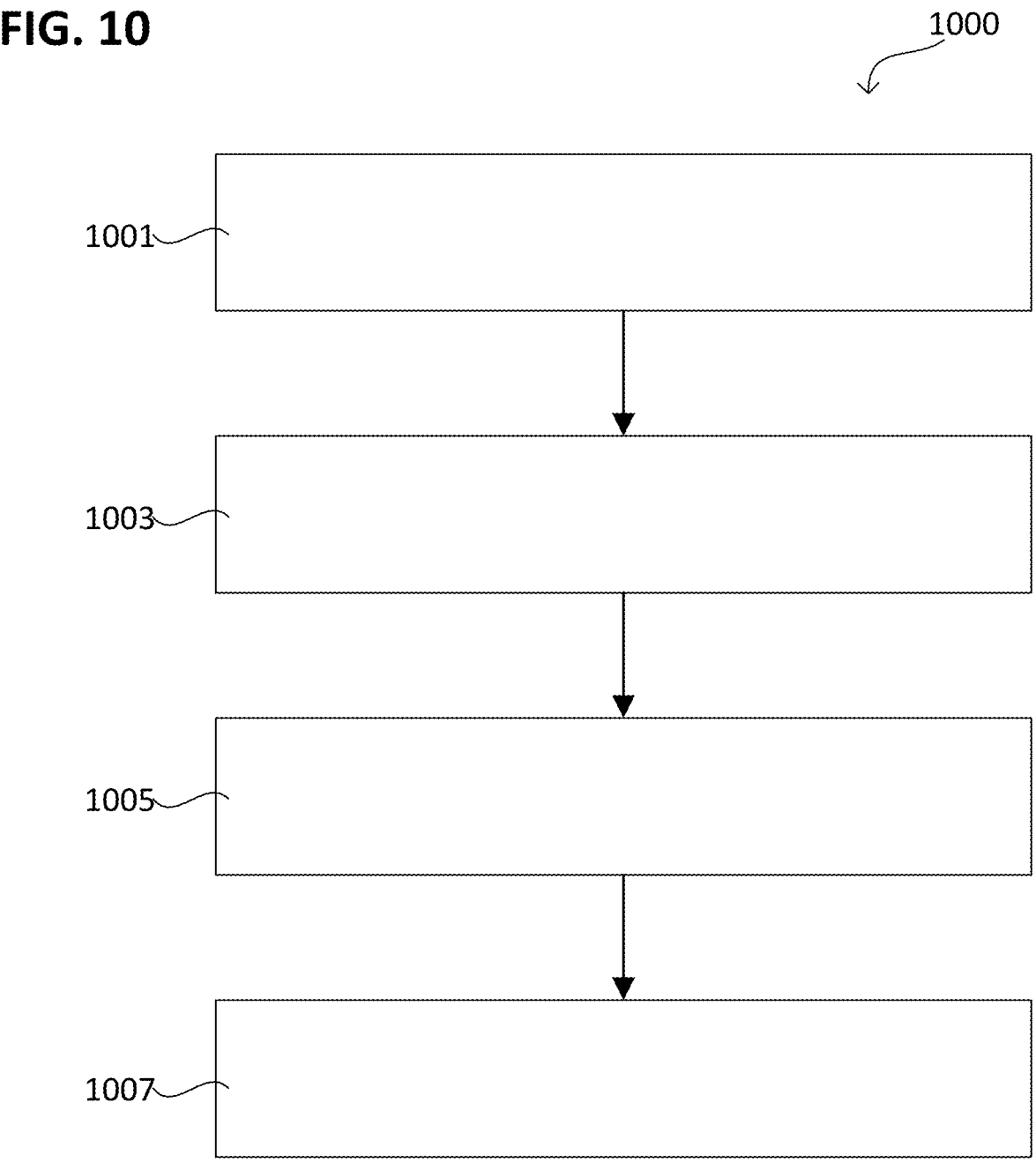
FIG. 10 shows a method according to various embodiments in a schematic flowchart.

FIG. 10 illustrates a method 1000 for clamping and/or attaching according to various embodiments in a schematic flow diagram, e.g., the self-supporting attachment 801 of the chromaticity diagram device on a hair tuft to be recognized according to method 800 and/or the clamping 901 of a hair tuft to be recognized by means of the hair clip device according to method 900.

According to various embodiments, the method 1000 in 1001 may have: Pressing of the hair tuft to be captured against the chromaticity diagram, e.g., against an edge of the chromaticity diagram. This can reduce shadowing. For example, the hair tuft can be pressed against the recognition region and/or at least partially into the recognition region. When the recognition region has a passage opening, the hair tuft can be pressed at least partially into the passage opening. If the recognition region has a transparent or translucent surface element (e.g., a film or a grid), the hair tuft can be pressed against the surface element.

Optionally, the method 1000 in 1003 may have: Causing self-carrying of the chromaticity diagram device against its weight.

Optionally, the method 1000 in 1005 may have: Forming a form-fitting connection between the hair clip device and the hair tuft (e.g., by means of teeth of the hair clip device).

Optionally, the method 1000 in 1007 may have: Arranging a hairline of the hair tuft at the recognition region (i.e., at least partially at the edge of the recognition region and/or partially in the recognition region). For example, the hairline may be visible through the recognition region. Then the image data can represent the hairline. For example, the chromaticity diagram device can be arranged such that it is arranged on the hairline.

The hairline may clearly be undyed. Determining the natural hair color of the hair may thus be facilitated. For example, the region of the hair tuft that is captured may have a color difference.

Figure 11:
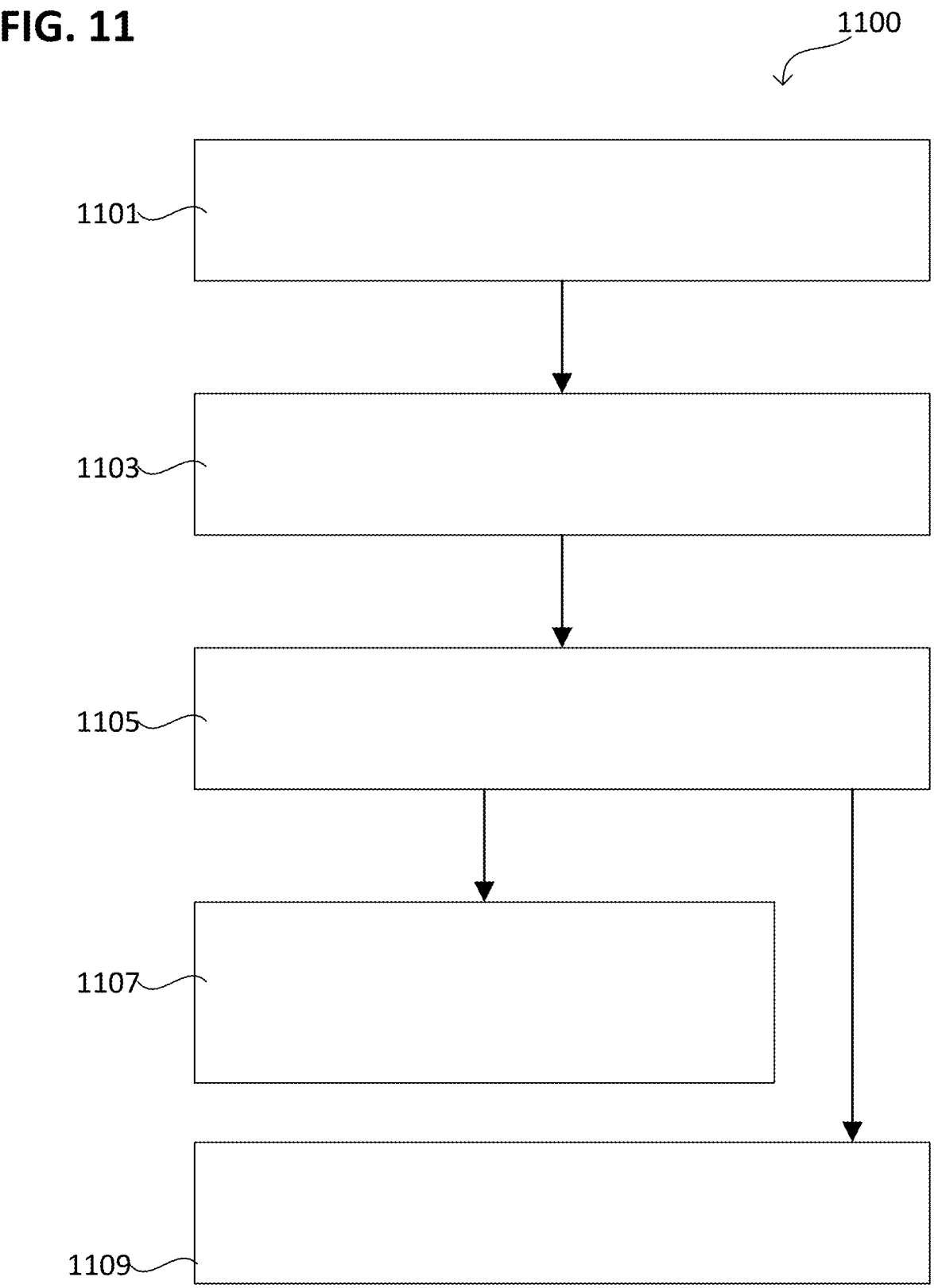
FIG. 11 shows a method according to various embodiments in a schematic flowchart.

FIG. 11 illustrates a method 1100 for performing an optical color recognition in a schematic flow diagram, e.g., according to method 800 and/or according to method 900.

According to various embodiments, the method 1100 in 1101 may have: Capturing image data of the chromaticity diagram and hair tuft. The optical color recognition can take place based on the image data.

According to various embodiments, capturing image data may have: Capturing light which is reflected from the chromaticity diagram device and hair tuft (e.g., in a reflection measurement). The light may have a wavelength in the visible range, e.g., in a range from about 380 nanometers (nm) to about 780 nanometers. Reflection can be understood as diffuse reflection (remission) and/or directional reflection. Remission can be understood as the diffuse (undirected) reflection of light, in contrast to the regular directed reflection (in accordance with the law of reflection).

Further, the optical color recognition may have providing the image data based on the reflected light. In other words, the image data may represent the reflected light.

Furthermore, the method 1100 in 1103 may have: Recognition of the chromaticity diagram (e.g., its recognition region and/or its reference colors) on the basis of the image data, e.g., using at least one position recognition mark of the chromaticity diagram 102.

Furthermore, the method 1100 in 1103 may have: Assigning a color information to each reference color and/or to the recognition region (e.g., a spectral distribution and/or a color valence) on the basis of the image data. The color valence of the light can describe an effect of the light on the color-sensitive sensory cells of the eye. In contrast to the spectral distribution, which contains the complete information about the spectral colors present in the light, the color valency is limited to an information that can be represented by three numerical values, which is decisive for the color sensation that the light triggers in the eye.

The reference color may have or represent reference color information. Clearly, the color information may be falsified due to external influences and may differ from the reference color information.

Furthermore, the method 1100 in 1105 may have: Determining a correction information based on the image data (the reference colors). The correction information may represent a difference of the color information from the reference color information. The correction information can clearly describe the falsification (e.g., due to external influences). According to various embodiments, the optical color recognition may have, based on a comparison between the reference color information and the color information, determining the correction information for each of the reference colors.

Furthermore, the method 1100 in 1107 may have: Determining a hair color information (may also be referred to as a hair color, e.g., a spectral distribution and/or a color valence of the hair tuft) based on the correction information and the color information of the recognition region. Clearly, the determined (e.g., falsified) hair color can be corrected.

Alternatively or additionally, the method 1100 in 1109 may have: Correcting the captured (e.g., falsified) image data based on the correction information. The hair color information may then be determined based on the image data which has been corrected (may also be referred to as corrected image data).

Figure 12:
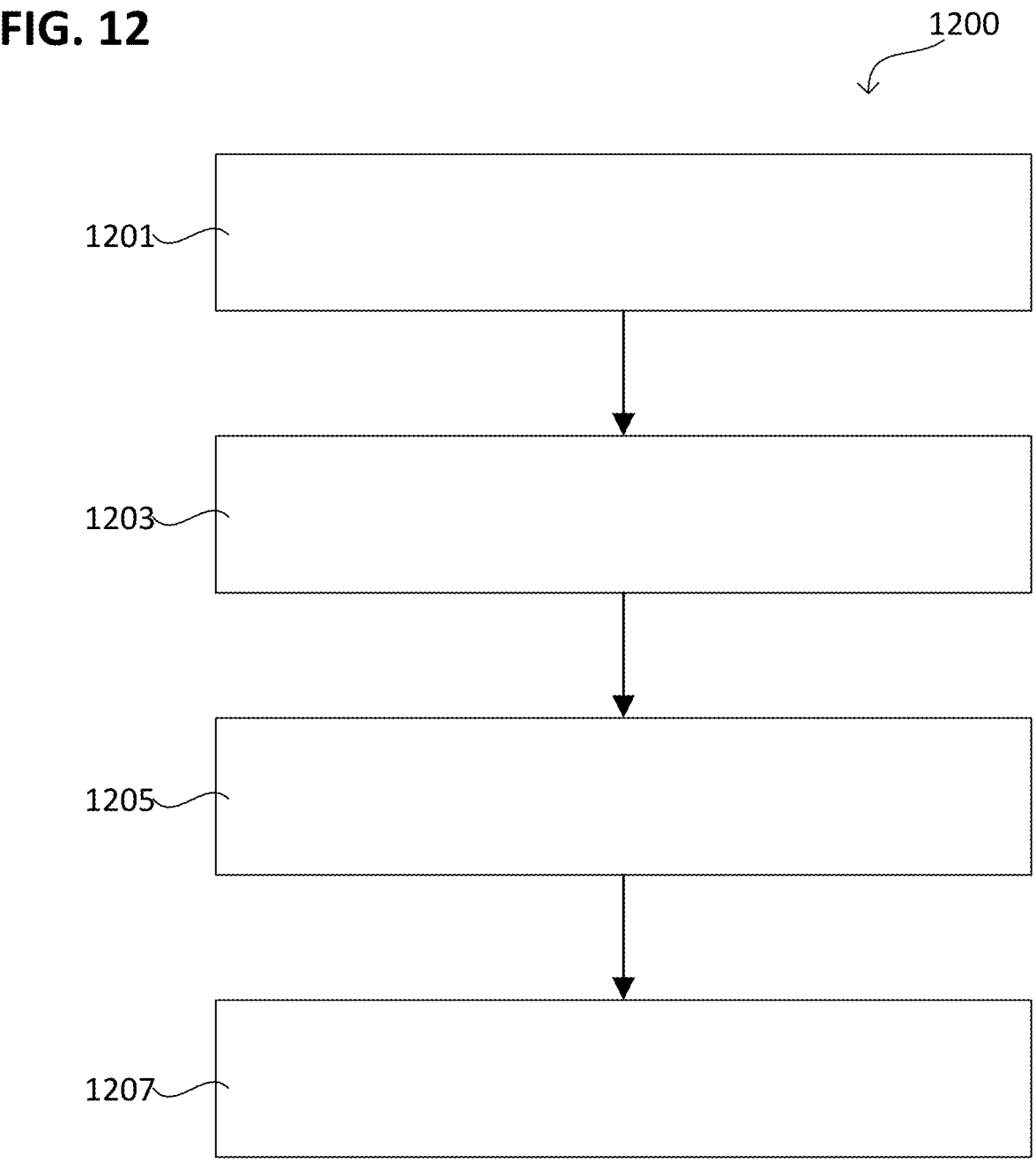
FIG. 12 shows a method according to various embodiments in a schematic flowchart.

FIG. 12 illustrates a method 1200 for performing an optical color recognition in a schematic flow diagram.

According to various embodiments, the method 1200 in 1201 may have the method 800 and/or the method 900.

Furthermore, the method 1200 in 1203 may have: Determining a coloring agent on the basis of the color recognition, which causes a color change according to a specification by application to the hair tuft. For example, the coloring agent may be selected from a variety of predefined coloring agents.

Optionally, the method 1200 in 1205 may have: Using a mobile device (may also be referred to as a mobile color recognition device) to perform the color recognition. The mobile device may have at least one image capture device (e.g., an image capture device and/or two image capture devices), e.g., at least one camera, and a display device, e.g., an electronic display.

Furthermore, the mobile device may have a processor which is arranged to perform the optical color recognition. Optionally, the mobile device may have a memory (e.g., non-volatile) which has code segments that represent the optical color recognition. The processor may be arranged to process the code segments. Optionally, the code segments may represent the reference color information. Optionally, the code segments may represent the plurality of coloring agents. The processor may then be arranged to determine a coloring agent of the plurality of coloring agents, which causes a color change according to a specification by application to the hair tuft.

Optionally, the mobile device may have a controller (e.g., a microcontroller), which is arranged to provide a radio connection. The controller may be arranged to provide a physical access to radio resources in accordance with a cellular long-distance radio communication technology (e.g., cellular connection) and/or a short distance radio communication technology (e.g., Bluetooth). For example, the controller may have a transponder for transmitting and/or receiving signals (e.g., data) via the communication technology and a transponder circuitry for controlling the transponder. For example, the controller may be arranged to provide a cellular connection and/or a short-range wireless data transmission.

According to various embodiments, the processor may have or be formed from an application processor. The application processor may be arranged to support one or more applications (may also be referred to as apps), e.g., in a mobile operating system environment.

According to various embodiments, the mobile device may have or be formed from a handheld computer (e.g., a smart phone and/or a tablet computer) or a laptop. The mobile device may have an energy store (e.g., an accumulator and/or a battery).

Optionally, the method 1200 in 1207 may have: Capturing the image data through the recognition region, at which the hair tuft to be recognized is clamped.

Figure 13:
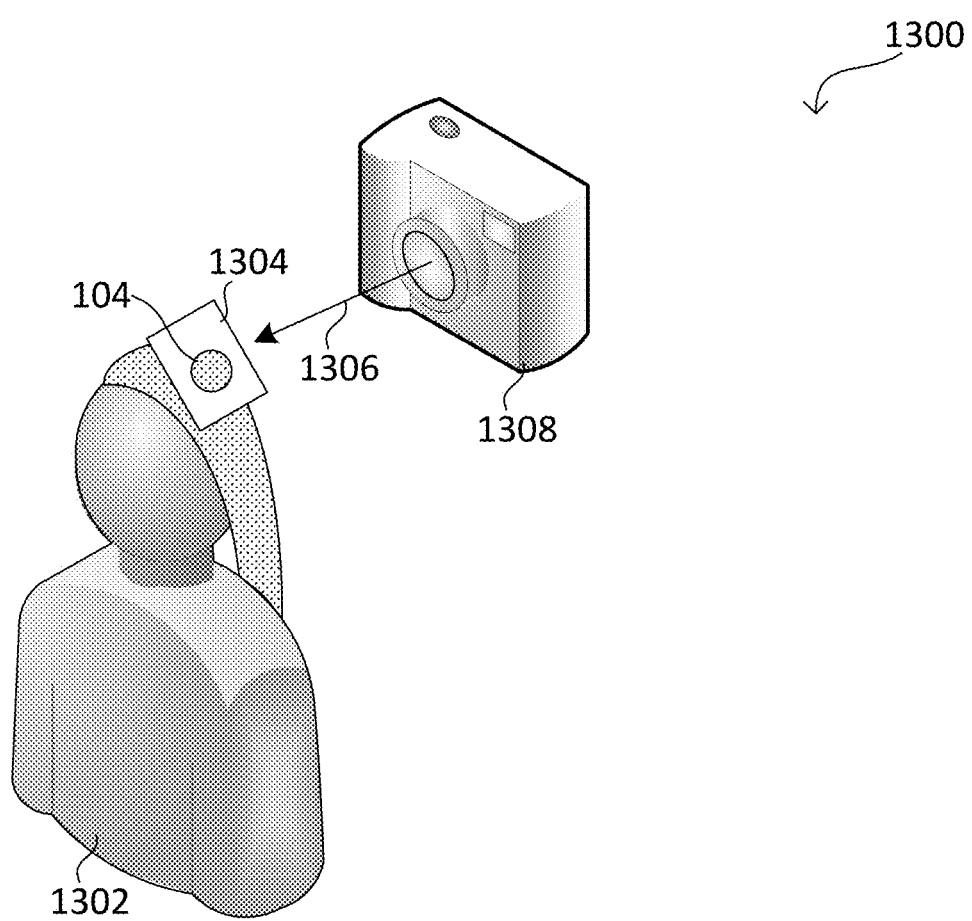
FIG. 13 shows a method according to various embodiments in a schematic perspective view.

FIG. 13 illustrates a method 1300 for performing an optical color recognition, e.g., according to method 800 and/or according to method 900.

According to various embodiments, a chromaticity diagram device 1304 (e.g., one of the chromaticity diagram devices described herein) may be attached to a hair tuft of a person 1302. The chromaticity diagram device 1304 may be attached self-supporting. Furthermore, image data of the chromaticity diagram device 1304 attached to the hair tuft may be captured 1306. The capturing 1306 of the image data may be done by means of a (e.g., mobile) color recognition device 1308 which has an image capture device (e.g., a camera).

The chromaticity diagram device 1304 clearly enables photographing of the hair or use of the camera (e.g., a mobile phone having a corresponding application) with both hands.

The chromaticity diagram device 1304 may be aligned with its second side 100*u* toward the hair tuft. The chromaticity diagram device 1304 may be aligned with its first side 100*o* toward the color recognition device 1308. The capturing of the image data can take place by means of the recognition region 104. For example, the hair tuft may be visible through the recognition region 104 and/or e.g., may be partially extended through the recognition region.

Figure 14A:
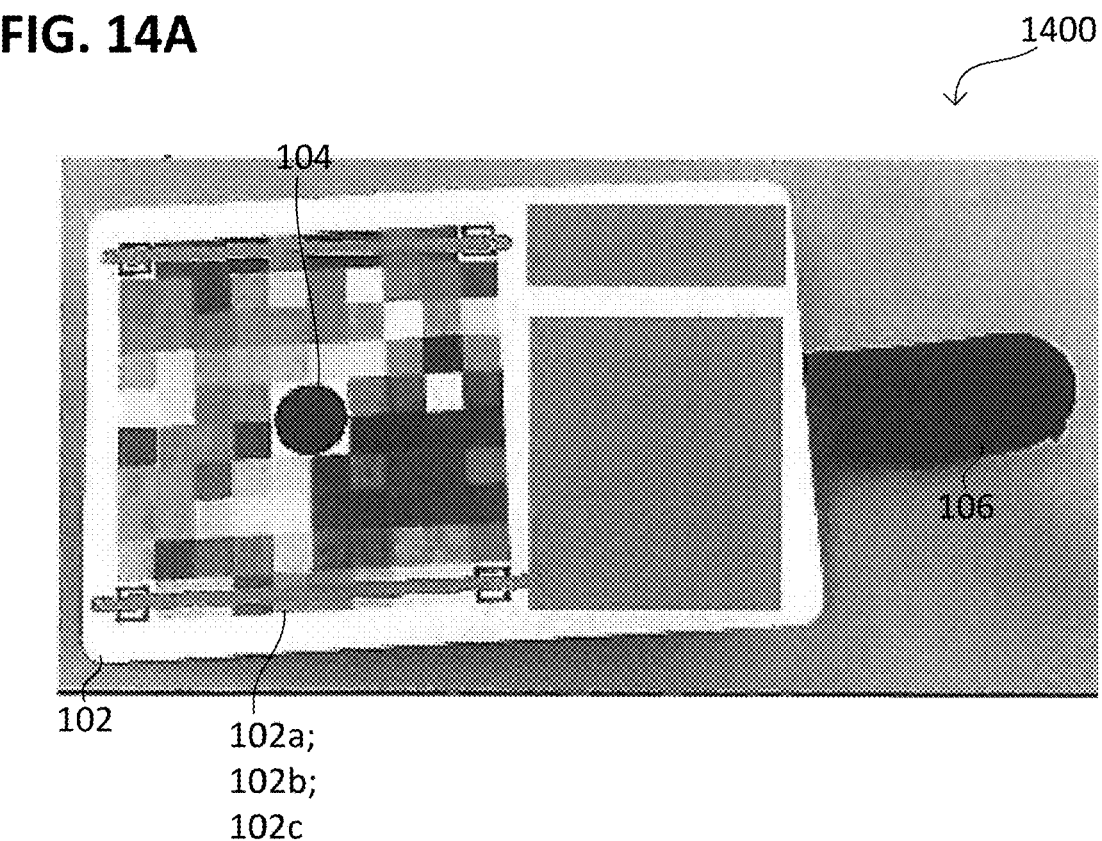
FIGS. 14A to 15 each show a chromaticity diagram device according to various embodiments in a schematic perspective view.
Figure 14B:
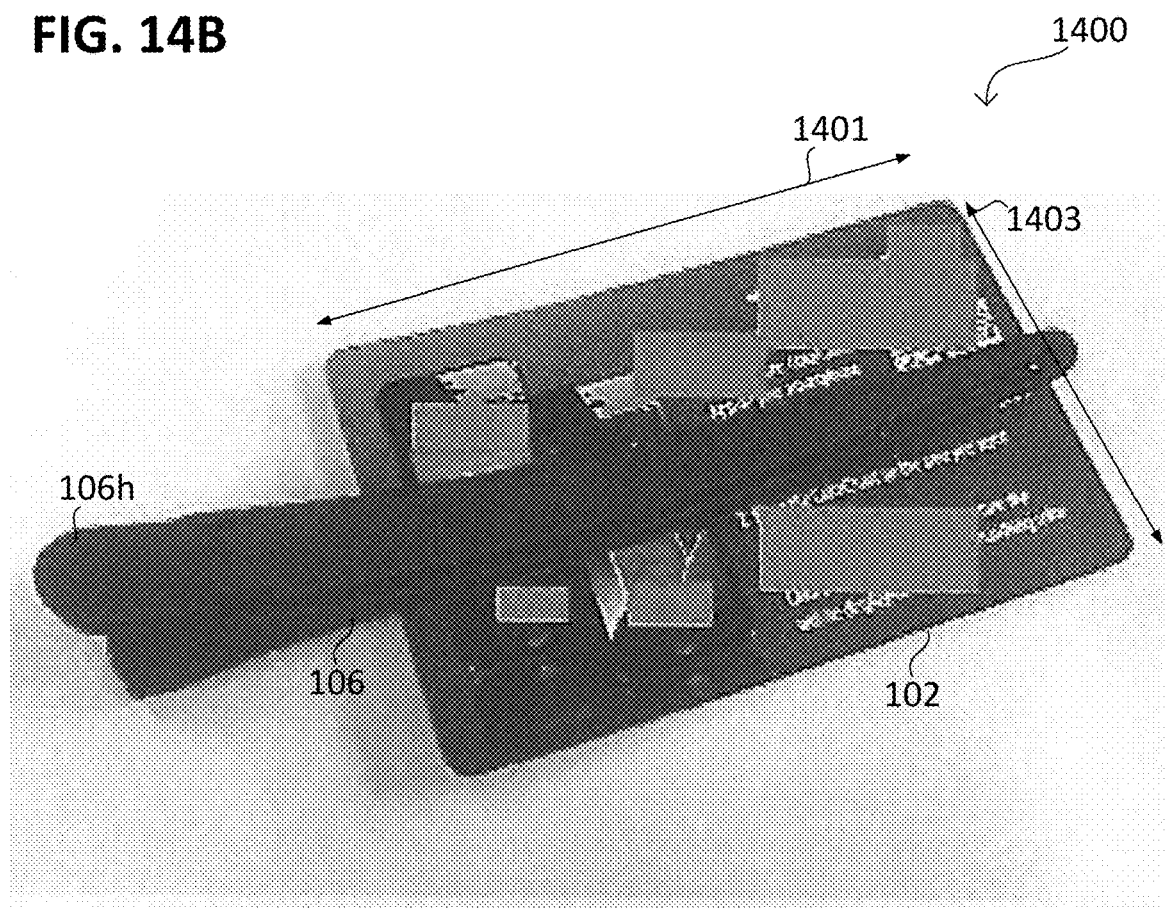
Figure 15:
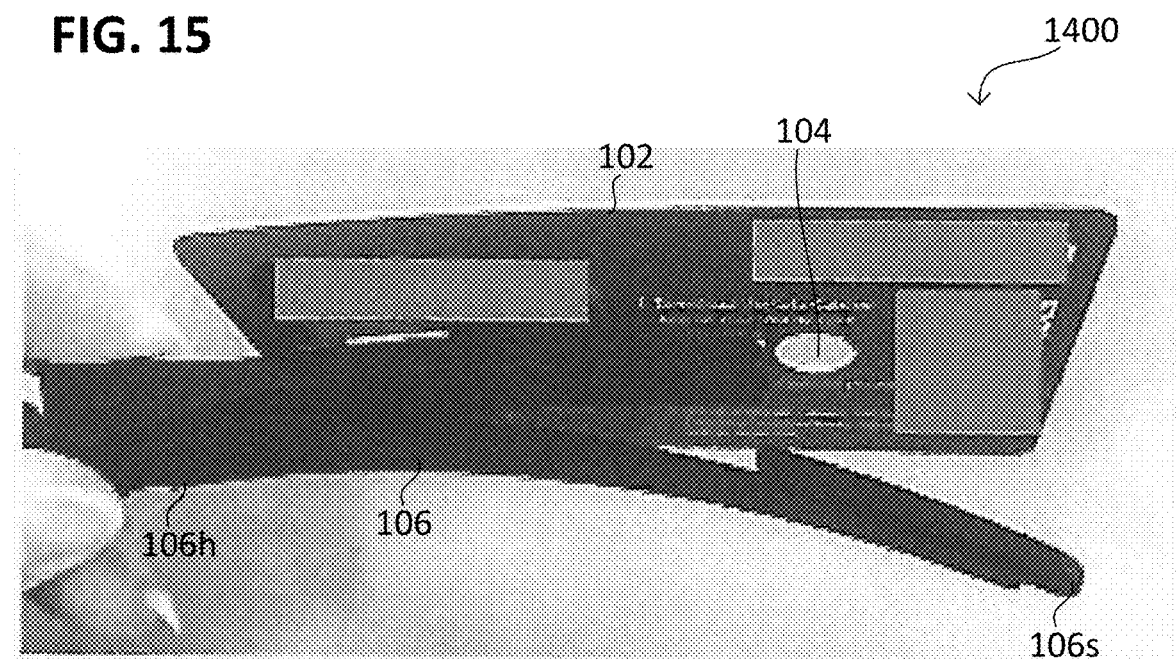

FIG. 14A illustrates a chromaticity diagram device 1400 according to various embodiments in a schematic perspective view (e.g., on a first side 100*o* of the chromaticity diagram device 1400), FIG. 14B illustrates the chromaticity diagram device 1400 in a schematic perspective view (e.g., on a second side 100*u* of the chromaticity diagram device 1400) and FIG. 15 illustrates the chromaticity diagram device 1500 in a schematic perspective view (e.g., on a second side 100*u* of the chromaticity diagram device 1500).

According to various embodiments, the chromaticity diagram 102 may have a plurality of reference colors 102*a*, 102*b*, 102*c*. The reference colors 102*a*, 102*b*, 102*c* may be arranged in a matrix. The matrix may clearly have a plurality of color fields, each of which has a reference color 102*a*, 102*b*, 102*c*. Alternatively or additionally, the chromaticity diagram 102 may have at least one hue in one or more brightness value gradations. In other words, the, e.g., at least two, reference colors 102a, 102b, 102c may differ in their brightness value (e.g., colorimetric brightness). Alternatively or additionally, the, e.g., at least two, reference colors 102a, 102b, 102c may differ in their hue and/or their saturation.

Each reference color 102a, 102b, 102c may be defined by a basic hue. For example, the chromaticity diagram 102 may have one or more natural hues (e.g., brown, olive green, beige, white) as reference colors 102a, 102b, 102c. The natural hues may also be labeled with other names, such as curry, honey, caramel, sand, latte, corn, chocolate, cocoa, tobacco, cognac, copper, brass, chestnut, mustard, camel.

The chromaticity diagram 102 (e.g., the matrix) may have more than or equal to 3 reference colors 102a, 102b, 102c (e.g., reference color fields), e.g., more than or equal to about 5, e.g., more than or equal to about 10, e.g., more than about 15, e.g., more than or equal to about 25, e.g., more than or equal to about 50, e.g., more than or equal to about 100.

According to various embodiments, the chromaticity diagram 102 may have a first extent 1401 in a range of about 2 centimeters (cm) to about 20 cm, e.g., in a range from about 5 cm to about 10 cm, e.g., about 8.5 cm. According to various embodiments, the chromaticity diagram 102 may have a second extent 1403 perpendicular to the first extent 1401, in a range of about 2 centimeters (cm) to about 20 cm, e.g., in a range of about 3 cm to about 10 cm, e.g., about 5.5 cm.

According to various embodiments, the hair clip device 106 in the closed position may at least partially (partially or completely) cover the recognition region 104. For example, the hair clip device 106 (or its leg 106s) may have a widened end section (clearly paddle shaped) that completely covers the recognition region 104 in the closed position.

According to various embodiments, the recognition region 104 may have a polygonal cross section (e.g., square). Alternatively, the recognition region 104 may have a round cross section.

According to various embodiments, the chromaticity diagram 102 may be curved. Thus, this may be, e.g., adapted to a head shape of the person 1308.

According to various embodiments, the chromaticity diagram 102 may have or be formed from a polymer. A polymer may have or be formed from at least one of the following: Rubber (e.g., synthetic rubber and/or natural rubber), a phenoplast (e.g., formed by phenolic resin), neoprene, nylon, polyvinyl chloride (PVC), polystyrene, polyethylene, polypropylene, polyacrylonitrile, polyethylene terephthalate (PET), polyvinyl butyral, silicone, etc. Alternatively or additionally, the chromaticity diagram 102 may have or be formed from a pulp, e.g., cardboard. Optionally, the chromaticity diagram 102 may be coated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A chromaticity diagram device, having:
a chromaticity diagram which has a plurality of mutually different reference colors, wherein the chromaticity diagram has a transparent or translucent recognition region where a hair tuft can be captured for hair color analysis, wherein an edge defines the recognition region; and
a hair clip device attached to the chromaticity diagram or integrally formed on the chromaticity diagram, which hair clip device is arranged to clamp the hair tuft to the recognition region, the hair clip device comprising:
a support, wherein the chromaticity diagram is formed on the support;
a leg; and
a hinge formed between the support and the leg, wherein a gap is formed between the support and the leg for receiving the hair tuft,
wherein, in a closed position, the hair clip presses the hair tuft against the edge of the recognition region, and
wherein the recognition region is formed by a transparent or translucent solid material.

2. The chromaticity diagram device according to claim 1, wherein the hair clip device presses the hair tuft directly against the chromaticity diagram in the closed position such that only the hair tuft is located between the chromaticity diagram and the leg of the hair clip.

3. The chromaticity diagram device according to claim 2, wherein a force generated by the hair clip device is greater than a weight force of the chromaticity diagram device and wherein the force generated by the hair clip device is applied only to the hair tuft, so that the chromaticity diagram device is carried on the hair tuft to be recognized.

4. The chromaticity diagram device according to claim 1, wherein the chromaticity diagram has at least one optical position recognition mark for recognizing the position of the chromaticity diagram.

5. A method for color recognition, the method comprising:
attaching the chromaticity diagram device of claim 1 to a selected hair tuft to be recognized by clamping the hair tuft between the support and the leg, wherein only the selected hair tuft is located between the support and the leg;
capturing image data of the chromaticity diagram and the selected hair tuft with a mobile device;
performing an optical color recognition of the selected hair tuft with the mobile device by processing code segments that represent the optical color recognition; and
selecting a coloring agent with the mobile device on the basis of the optical color recognition, wherein the coloring agent is selected to cause a color change of the selected hair tuft by application of the coloring agent to the selected hair tuft.

6. A method for color recognition by means of the chromaticity diagram device of claim 1, the method comprising:
clamping a selected hair tuft to be recognized with the hair clip device by inserting the selected hair tuft between the support and the leg, wherein the hair clip device presses the selected hair tuft directly against the transparent recognition region; and
performing an optical color recognition of the selected hair tuft using the chromaticity diagram device.

7. The method according to claim 6, wherein a force generated by the hair clip device is greater than a weight force of the chromaticity diagram device and wherein the force generated by the hair clip device is applied only to the selected hair tuft such that the chromaticity diagram device is carried against its weight force on the selected hair tuft to be recognized.

8. The method according to claim 6, wherein performing the optical color recognition has capturing image data of the chromaticity diagram and the selected hair tuft, on the basis of which the optical color recognition is performed.

9. The method according to claim 6, further comprising:
determining a coloring agent on the basis of the color recognition, which causes a color change according to a specification by application to the selected hair tuft.

10. The method according to claim 6, wherein the color recognition is performed by means of a mobile device.

11. The method of claim 5, wherein the hair clip device presses against the chromaticity diagram in the closed position.

12. The method of claim 11, wherein a force generated by the hair clip device is greater than a weight force of the chromaticity diagram device, so that the chromaticity diagram device is carried on the selected hair tuft to be recognized.

13. The method of claim 11, wherein the chromaticity diagram has at least one optical position recognition mark for recognizing the position of the chromaticity diagram.

14. The method according to claim 5, wherein a spring urges the support and the leg together to clamp the selected hair tuft.

15. The method according to claim 14, wherein the spring generates a contact force between the chromaticity diagram device and the selected hair tuft that is greater than a weight force of the chromaticity diagram device.

16. The method according to claim 14, wherein the chromaticity diagram device includes teeth to penetrate the selected hair tuft.

* * * * *